(12) United States Patent
Cheung et al.

(10) Patent No.: US 10,337,911 B2
(45) Date of Patent: Jul. 2, 2019

(54) METHOD FOR MEASURING VIBRATION DISPLACEMENT USING STATE VARIATION PRINCIPLE

(71) Applicant: KOREA RESEARCH INSTITUTE OF STANDARDS AND SCIENCE, Daejeon (KR)

(72) Inventors: Wan Sup Cheung, Daejeon (KR); Kyung Min Baik, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 74 days.

(21) Appl. No.: 15/129,504

(22) PCT Filed: Apr. 10, 2015

(86) PCT No.: PCT/KR2015/003613
§ 371 (c)(1),
(2) Date: Sep. 27, 2016

(87) PCT Pub. No.: WO2015/156635
PCT Pub. Date: Oct. 15, 2015

(65) Prior Publication Data
US 2017/0122798 A1    May 4, 2017

(30) Foreign Application Priority Data

Apr. 10, 2014    (KR) .................. 10-2014-0042710

(51) Int. Cl.
*G01H 9/00*    (2006.01)
*G01B 9/02*    (2006.01)
*G01M 7/02*    (2006.01)

(52) U.S. Cl.
CPC .......... *G01H 9/00* (2013.01); *G01B 9/02081* (2013.01); *G01B 9/02083* (2013.01); *G01M 7/025* (2013.01); *G01M 7/027* (2013.01)

(58) Field of Classification Search
CPC ........................................................ G01H 9/00
See application file for complete search history.

(56) References Cited

U.S. PATENT DOCUMENTS

| 5,028,137 A | 7/1991 | Sommargren et al. |
| 7,224,463 B1* | 5/2007 | Zumberge .......... G01B 9/02081 356/450 |

(Continued)

FOREIGN PATENT DOCUMENTS

| JP | 07032526 | 6/1995 |
| JP | 1026518 | 1/1998 |

(Continued)

OTHER PUBLICATIONS

Heydermann, "Determination and correction of quadrature fringe measurement errors in interferometer," Applied Optics, (1981).*

(Continued)

*Primary Examiner* — Hyun D Park
(74) *Attorney, Agent, or Firm* — STIP Law Group, LLC

(57) ABSTRACT

The present invention is aimed at providing measurement method for vibration displacement using state variation principle which achieves real time implementation through super high-speed DSP or FPGA as well as improves precision as much as picometer level and at the same time saves memory capacity compared to conventional invention.

9 Claims, 17 Drawing Sheets

(56) References Cited

U.S. PATENT DOCUMENTS 8,018,600 B2 * 9/2011 Takahashi .......... G01B 9/02083
356/498
2012/0247213 A1 * 10/2012 Zumberge ................ G01H 9/00
73/653

FOREIGN PATENT DOCUMENTS

JP 11201722 7/1999
KR 20130030156 3/2013

OTHER PUBLICATIONS

International Search Report, dated Jun. 30, 2015 (English Translation).

* cited by examiner

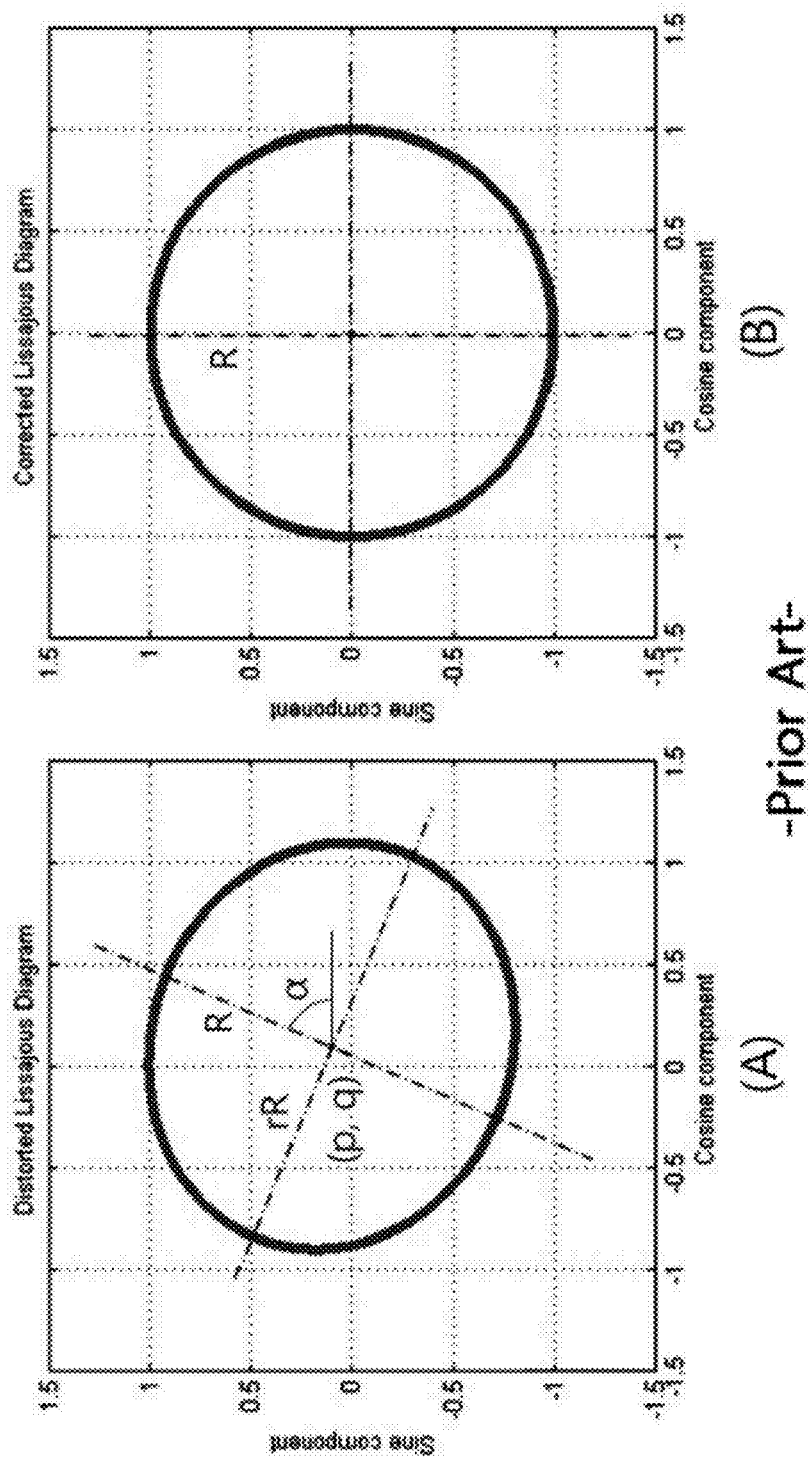
Fig. 3 -Prior Art-

[Fig. 4]
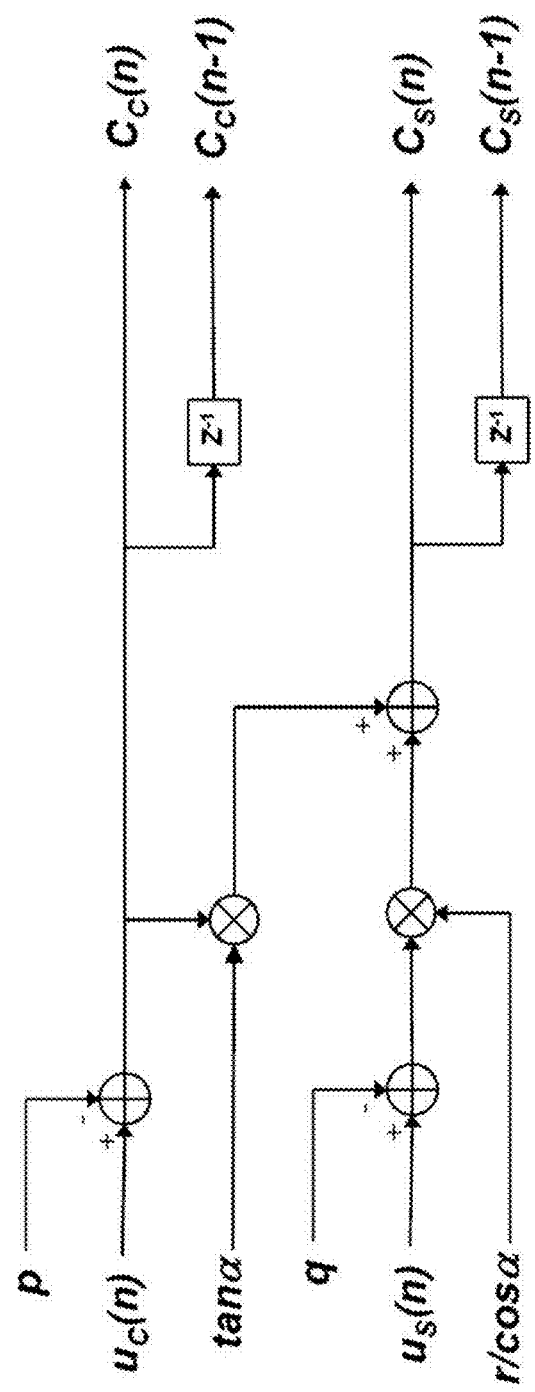

[Fig. 5]
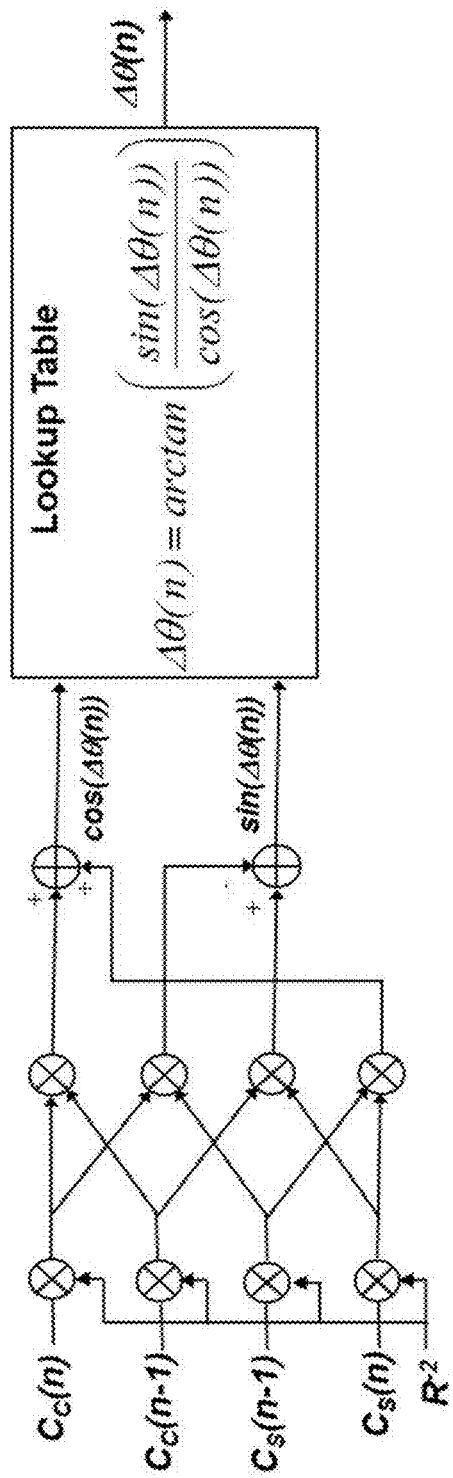

[Fig. 6]
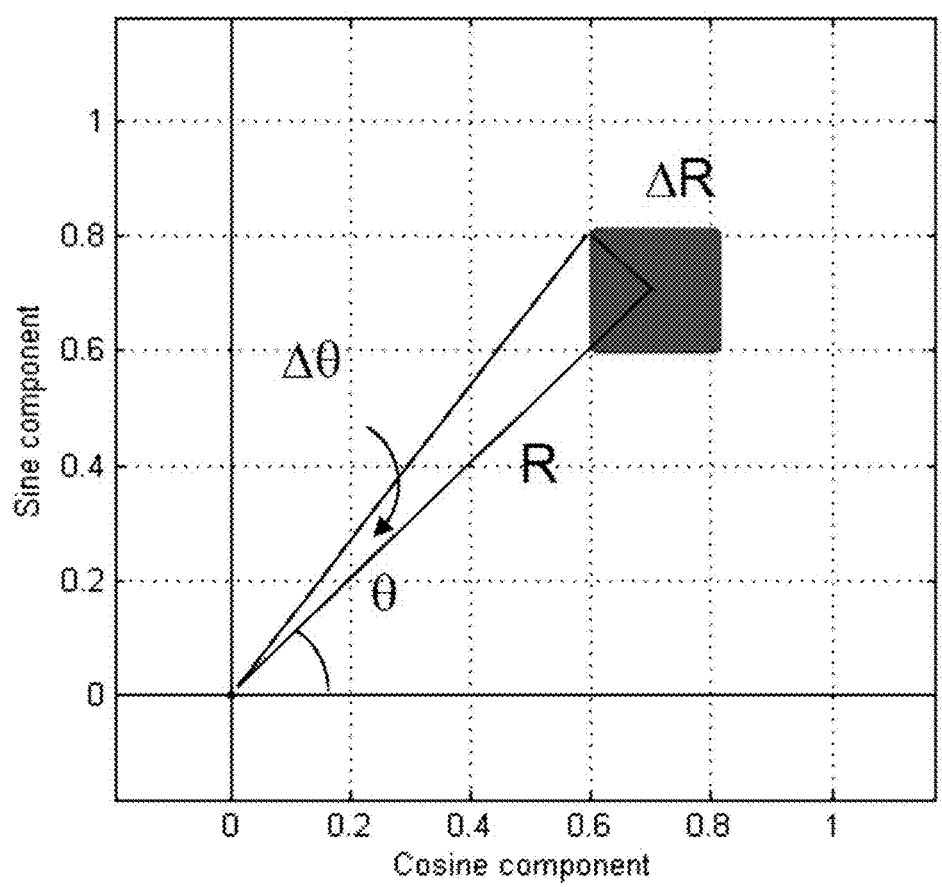

[Fig. 7]
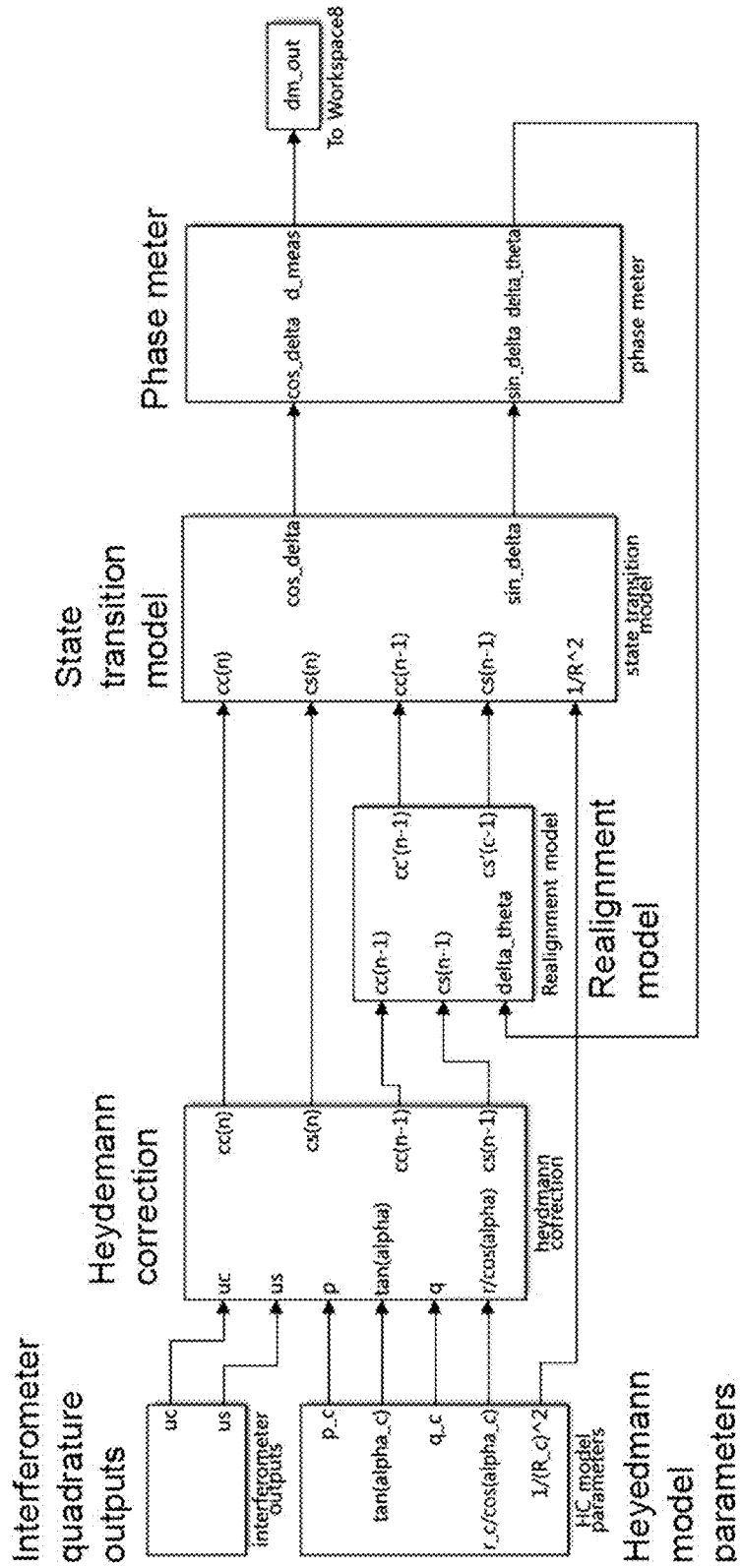

[Fig. 8]
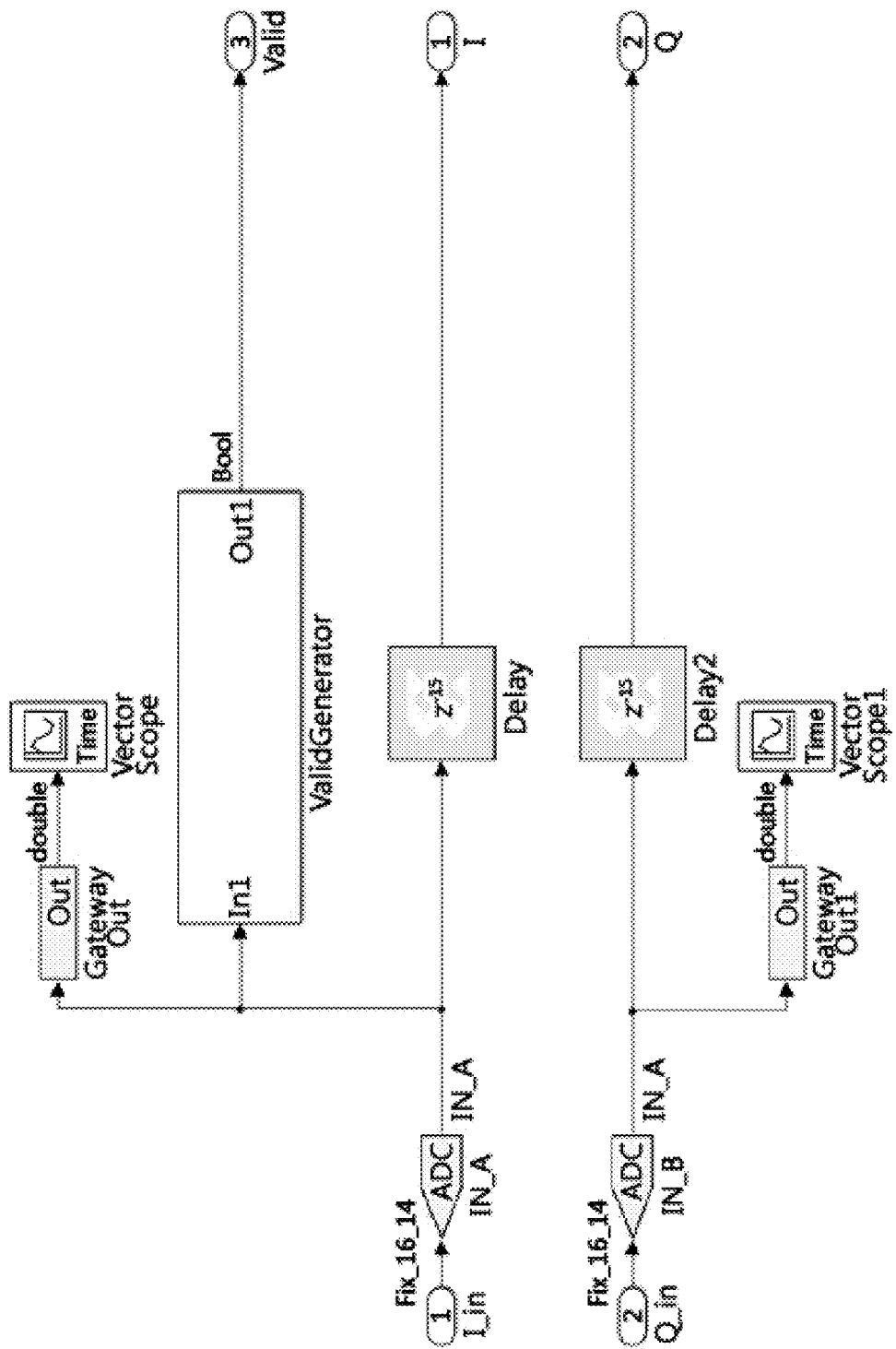

[Fig. 9]
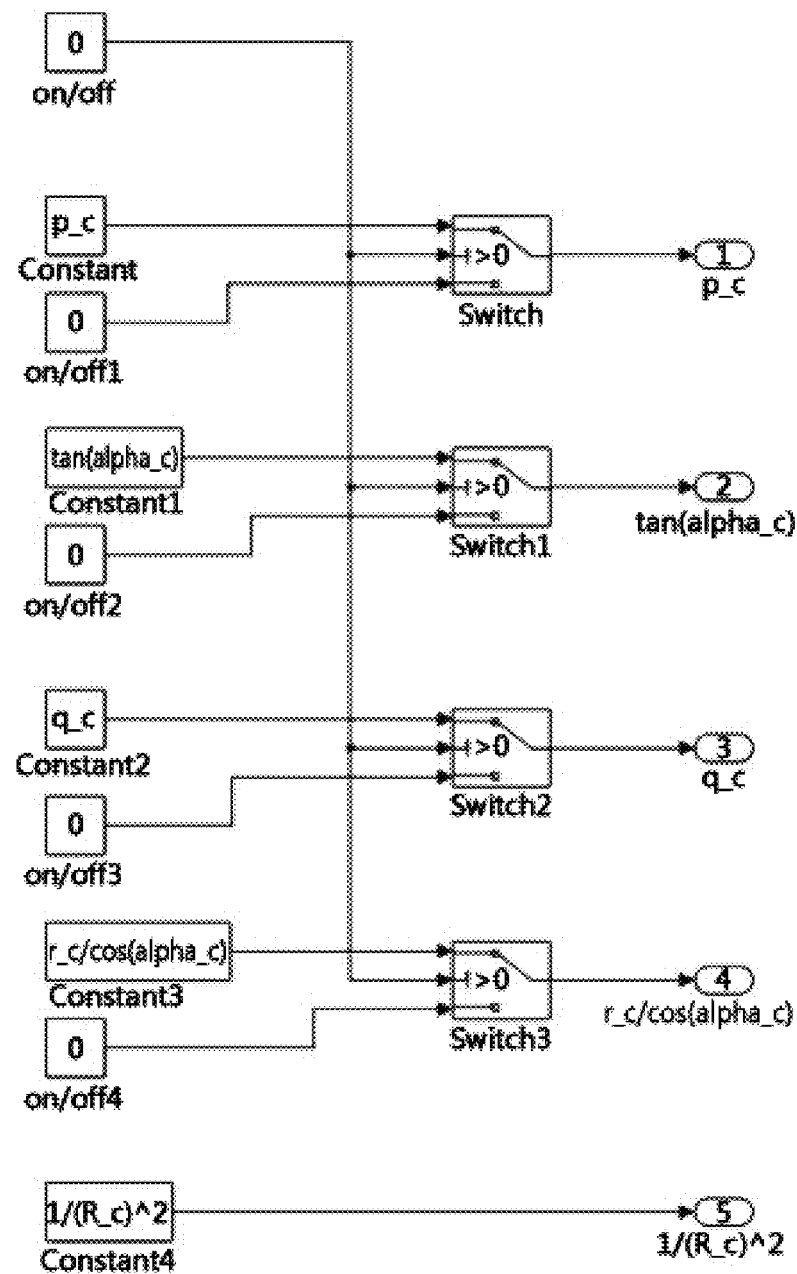

[Fig. 10]
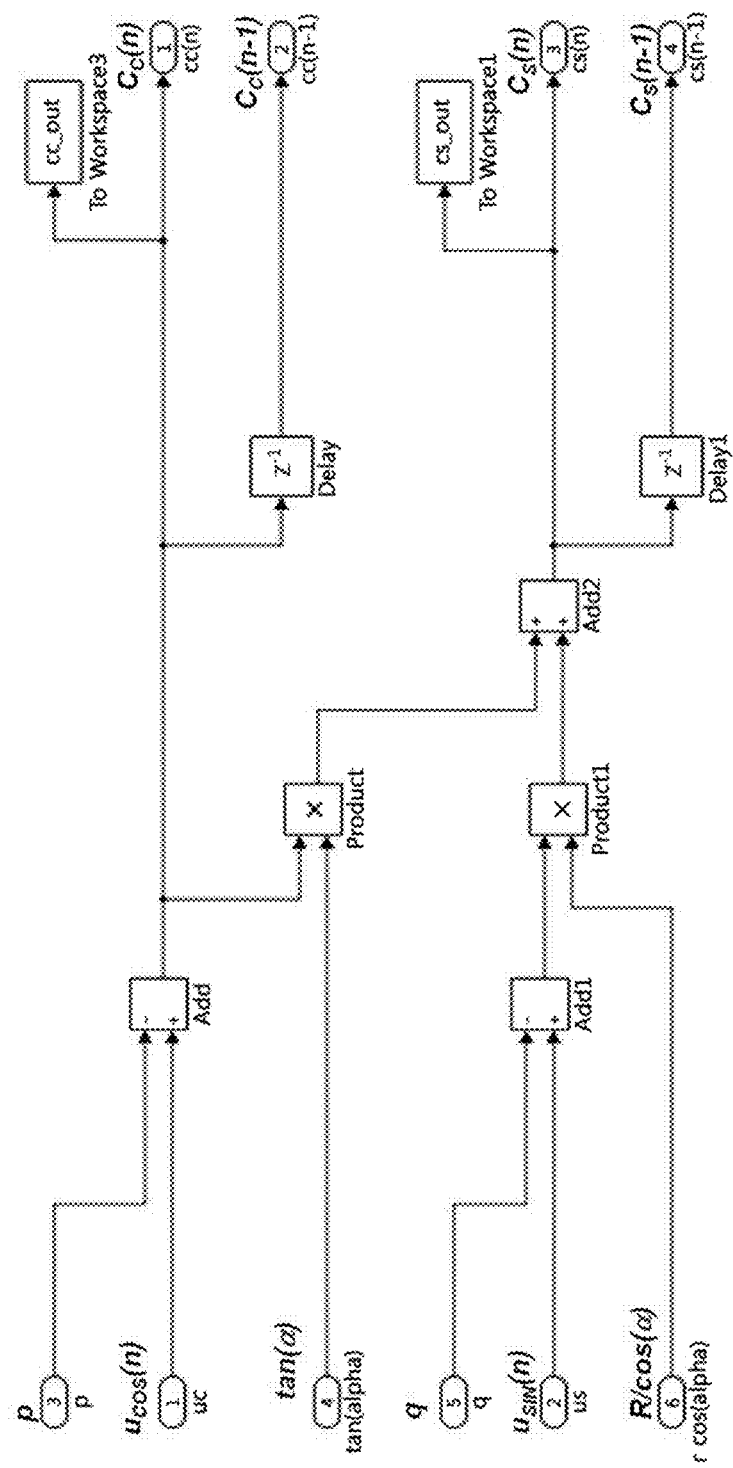

[Fig. 11]
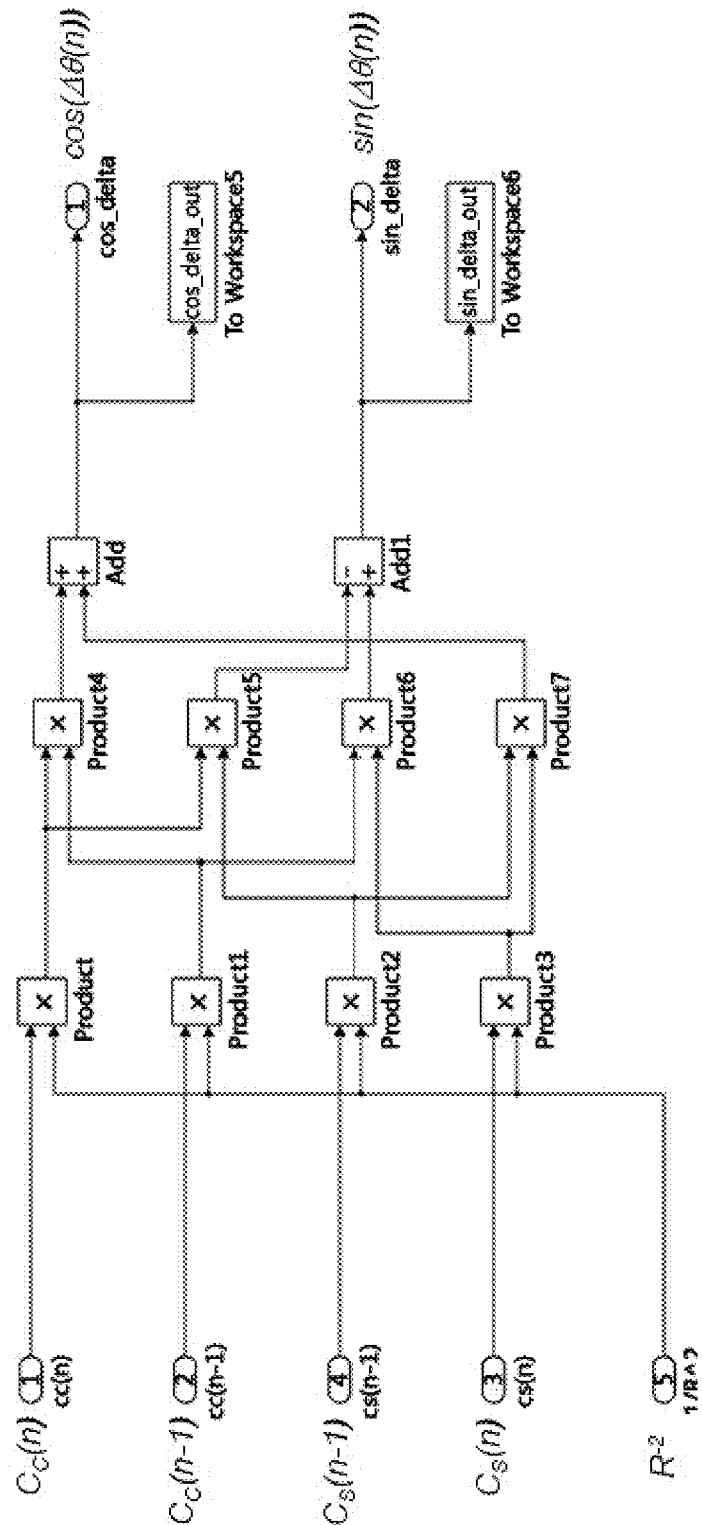

[Fig. 12]
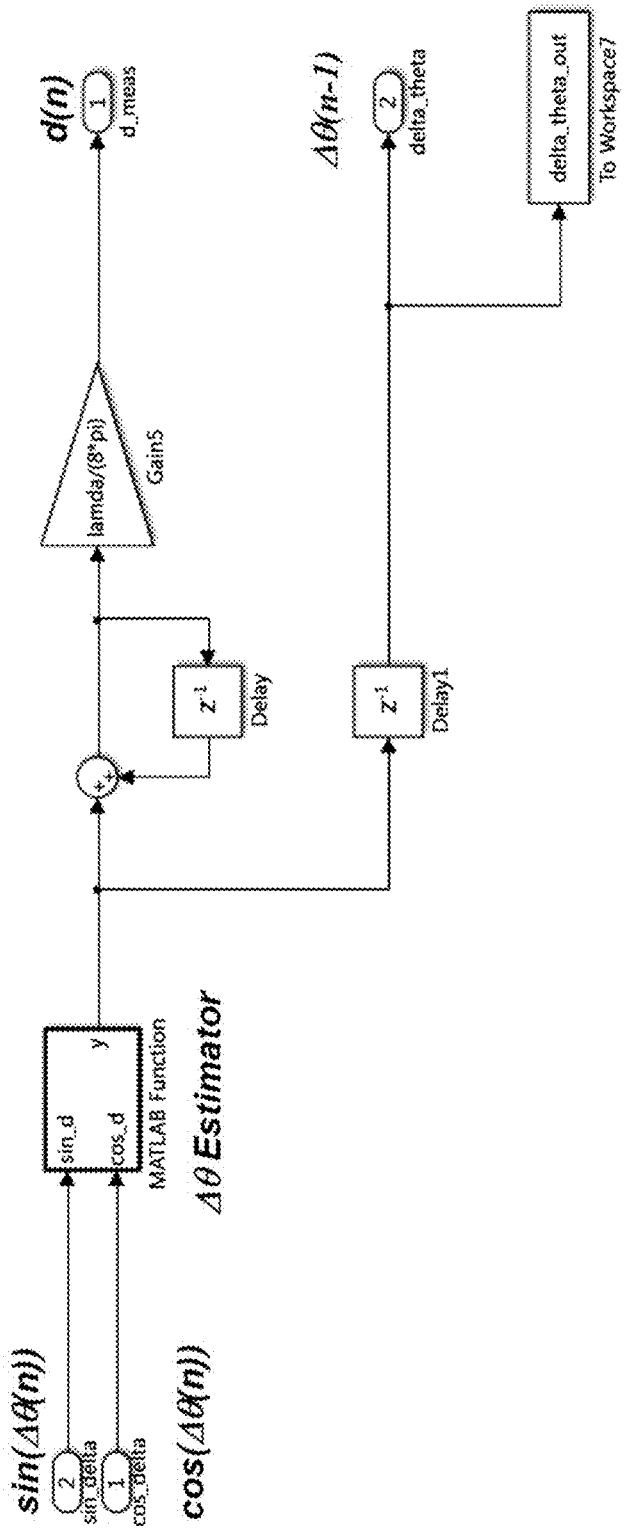

[Fig. 13]
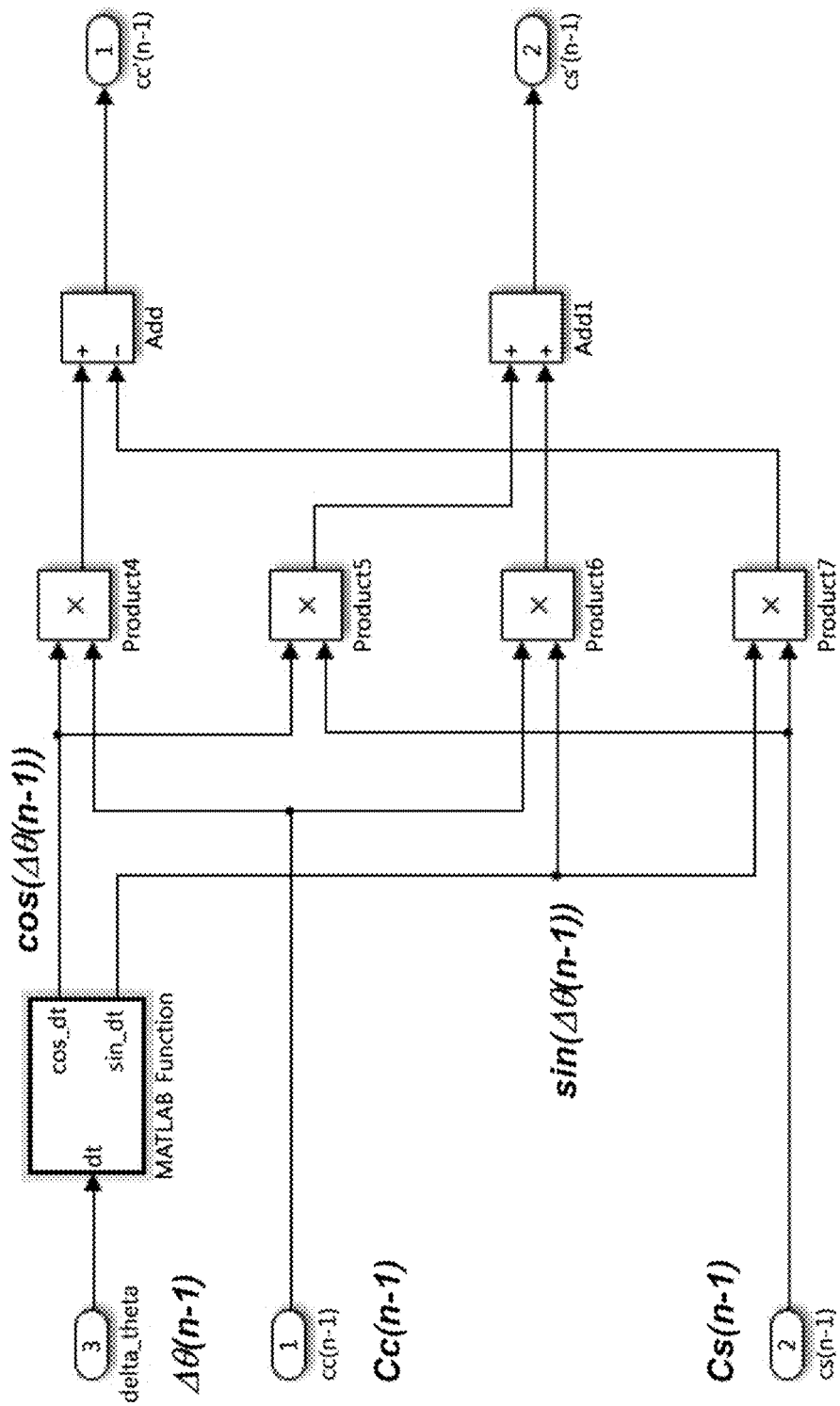

[Fig. 14]
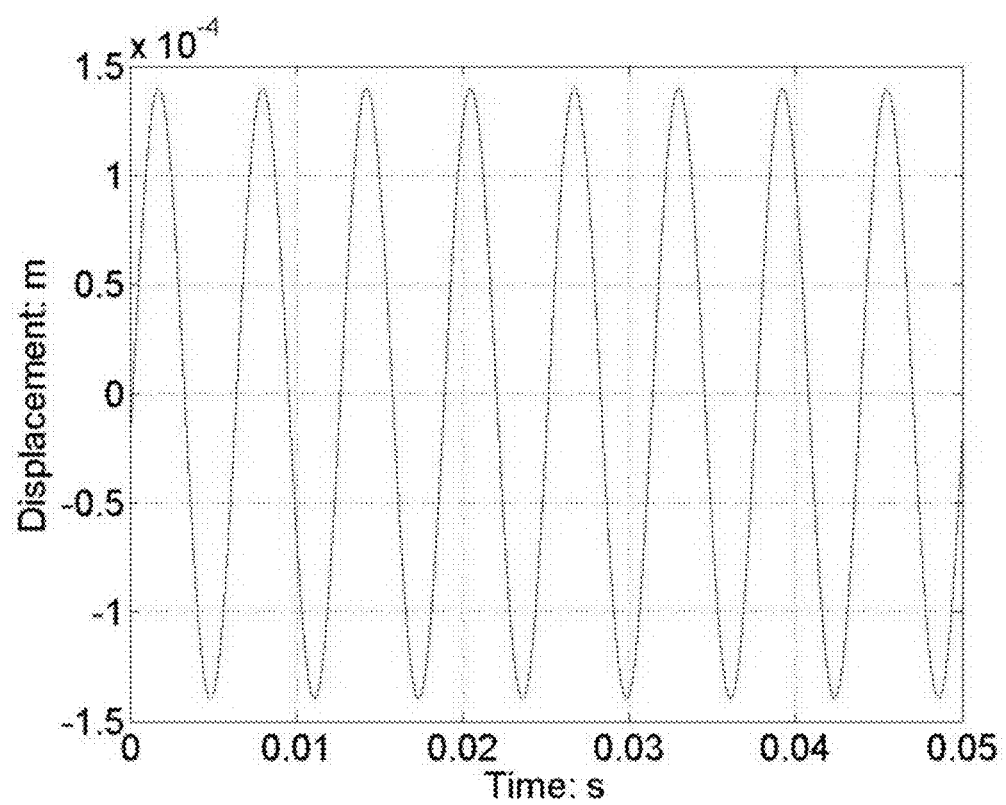

[Fig. 15]
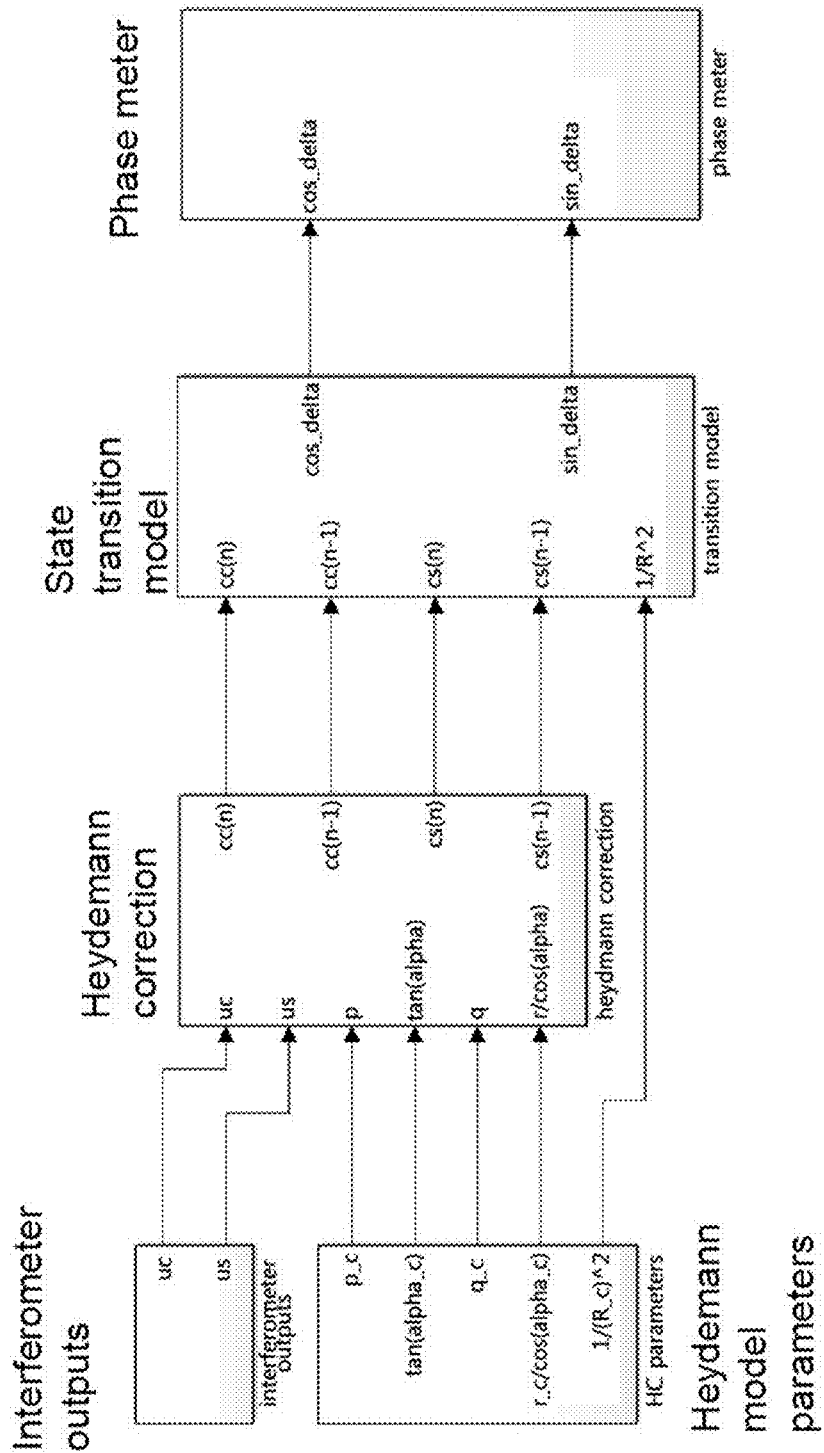

[Fig. 16]
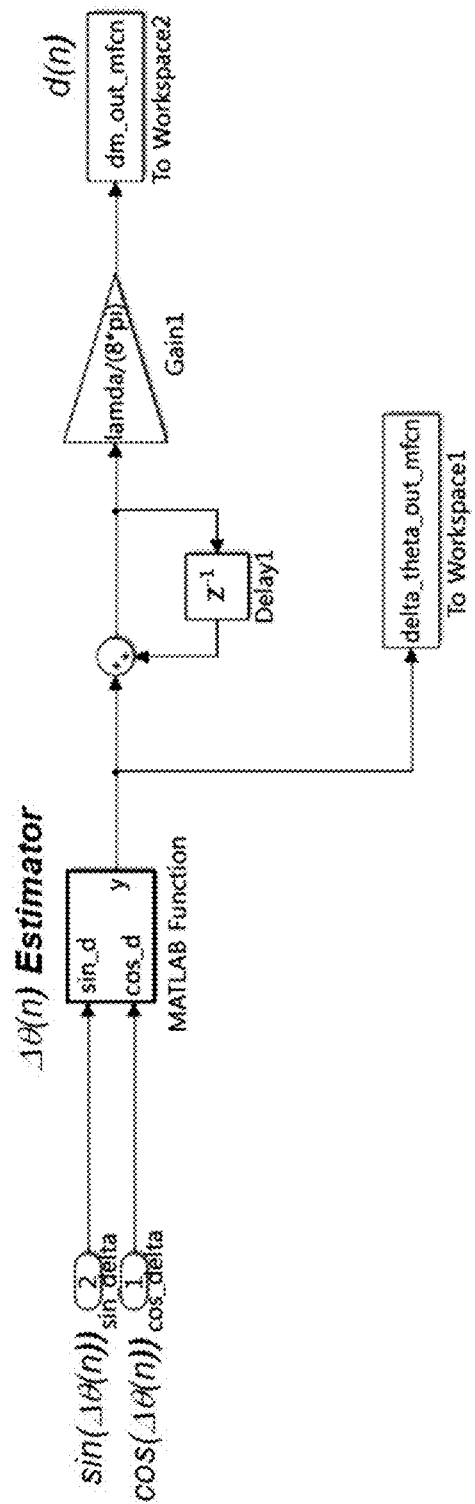

[Fig. 17]
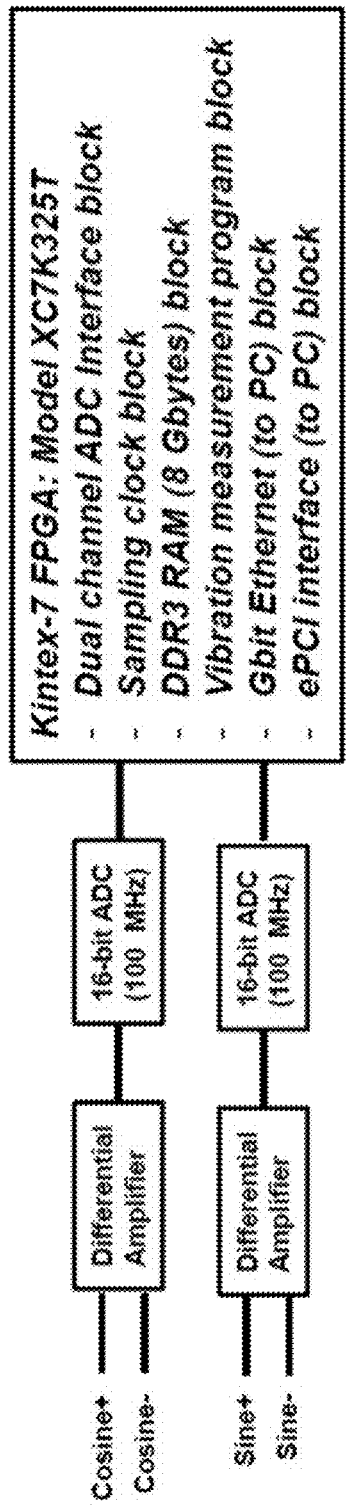

METHOD FOR MEASURING VIBRATION DISPLACEMENT USING STATE VARIATION PRINCIPLE

CROSS-REFERENCE TO RELATED APPLICATIONS

This application is the U.S. National Phase under 35 U.S.C. § 371 of International Application No. PCT/KR2015/003613 filed on Apr. 10, 2015, which in turn claims the benefit of Korean Application No. 10-2014-0042710, filed on Apr. 10, 2014, the disclosures of which are incorporated by reference into the present application.

TECHNICAL FIELD

The present invention relates to measurement method for vibration displacement using state variation principle. State variation principle is principle estimating small variation volume related to state value of the previous step, and in order to do so, it is necessary to state mathematically and exactly variation process between two steps which are adjacent to each other. Therefore, state values of all steps may be taken by applying state variation principle to each step.

Generally, variation sensor (accelerometer) outputs power from movement by outer variation as electrical signal, so that the vibration is possibly measured. Since every moving apparatus such as machine or electric device, etc. has vibration, if, especially, detailed movement control or position measurement is now needed according to the development of technology, it is very important to detect or correct such vibration.

For linear vibration field, a lot of national standards institutes have primary correction system, and the second correction method (comparison correction) by using standard level sensor corrected by primary correction system is also used in industrial site widely.

For angular vibration correction field, correction technology such as KR 2013-0030156 (Correction Method for 6-Axis Vibration Sensors using Periodic Angular Vibration and Its Realization System) filed by the present applicant, etc. is disclosed and primary correction method using laser interferometer is suggested in ISO 16063-15 as an primary correction technology. On the other hand, in the field of angular vibration correction, as of 2014, only PTB and KRISS among national standard institutes around the world have angular vibration primary correction system. Therefore, more development of technology is required in order to apply the system to actual industrial site conveniently and economically, in particular, by securing enough precision and accuracy at the same time.

Now, in the angular vibration correction field, laser interferometer for high precision dynamic displacement measurement consists of homodyne type or heterodyne type laser light source. Correction method for angular vibration sensor using laser interferometer may be simply explained as follows: FIG. 1 simply shows configuration of angular vibration primary correction system using laser interferometer that KRISS has. As shown in the FIG. 1, primary correction apparatus (100), as one embodiment, comprises rotation axis (110), Angular Exciter (120), Angular Vibration Table (130), Angle Prism (140), Optical Table (150), Laser Head (160), Plane Mirror (170), and Interferometer (180).

The rotation axis (110) rotates along with angular vibration by the angular exciter. As shown in the FIG. 1, on the edge of the rotation axis (110), an object (500) such as Angular Accelerometer, etc., which are formed as an angular vibration sensor. The angular vibration table (130) is formed as being stretched out in the direction of plane which is vertical to the rotation axis (110), and is coupled to the rotation axis (110) to rotate about the rotation axis (110).

At this time, on the optical table (150) which is formed as plane parallel to the angular vibration table (130), laser interferometer consisting of the laser head (160), the plane mirror (170), and the interferometer (180) is arranged. The laser head (160) lights laser beam toward the angle prism (140), and the plane mirror (170) reflects the laser beam lit from the laser head through the angle prism (140). The interferometer (180) measures difference between two beam channels generated by laser beam reflected from the plane mirror (170) and laser beam lit from the laser head (160) passing through the angle prism (140), i.e. interference signal of two laser beams according to relative displacement and the angle prism (140) may measure rotated angle displacement thereby (U.S. Pat. No. 5,028,137).

The angle displacement of the angle prism (140) measured by the laser interferometer (hereinafter the system consisting of the laser head (160), the plane mirror (170), and the interferometer is referred to as "laser interferometer".) is very precisely converted by measuring the difference of relative channel of laser beams passing through the angle prism (140), i.e. the displacement. The process converting angle displacement by measuring relative displacement measured by the laser interferometer is very precise measurement method for angle displacement and the angle displacement is being used standard value of angular vibration.

At this time, voltage input (V) signal is output from an object (500), and with the voltage input (V) signal, standard angle displacement (i.e. vibration amplitude displacement) as introduced above is measured at the same time in order to evaluate voltage sensitivity of the object (500), i.e. angular vibration sensor (angular accelerometer or gyroscope). Thus, method for evaluating voltage sensitivity of precise angular vibration sensor by using a laser interferometer is called primary correction in ISO 16063-15, and for more detail, see angular vibration primary correction procedure (KRISS-C-08-1-0073-2011) provided by KRISS.

BACKGROUND ART

As mentioned above, method for measuring displacement in a laser interferometer used for primary correction of vibration sensor is explained as follows. When a laser beam for measuring vibration displacement (corresponding to the laser passing through angle prism which rotates along with angular accelerometer in the embodiment of the FIG. 1) and a laser beam reflected from a fixed reference side (corresponding to the laser beam lit from the laser head of the embodiment of the FIG. 1, and the fixed reference side can be easily made by other mirrors, etc.) are overlapped with each other and are sent to the interferometer comprising a light sensor, difference of paths, i.e. cosine signal which is cosine component electrically output from the light sensor, and sine signal which is sine component electrically output according to vibration displacement, may be taken.

According to traditional method, after this cosine signal and sine signal are digitalized, phase and vibration amplitude are calculated by using lookup table. More details are as follows. As mentioned above, two signals, which are cosine/sine components electrically output from the light sensor generated by vibration displacement, are converted as $u \cos(n)$ and $u \sin(n)$ which are discretized value 8-bit (or 12-bit) by using digitalizer. And then, by using lookup table, phase and vibration amplitude are calculated. (n=1, 2, ..., N, N is the number of all data) FIG. 2 conceptually shows traditional method for measuring phase and vibration amplitude by using lookup table. That is, 16 bits information consisting of two digital values, u cos(n) and u sin(n) is used as input number of lookup table, and phase and vibration amplitude saved in a memory corresponding to the designated number are read. Phase from a lookup table is converted as displacement by using the following formula (A), and consequently, the vibration displacement is measured.

$$d(n) = \frac{\lambda}{4\pi \cdot N_B} \theta(n) \quad (A)$$

d: displacement
θ: phase
λ: laser wavelength (m)
$N_B$: reflection times of laser for measurement (single reflection $N_B$=1, double reflection $N_B$=2)

However, the existing method for measuring displacement by the cosine/sine signals converted as digital values and the lookup table has the following problems.

(1) If vibration amplitude of cosine and sine signals is different (ratio of vibration amplitude r≠1), if the two signals have quadrature error angle (α≠0), or if there are another DC components (p, q≠0), it meets technical limitation that displacement measurement at the picometer level cannot be realized with the existing method for measuring displacement.

(2) There is a disadvantage that a lookup table consisting of u cos(n) and u sin(n) discretized as 8-bit (or 12-bit) requires mass memory which is proportional to the size of the lookup table $2^{2Nb}$ (Nb=the number of bits of AD convertor). For example, when using 12-bit AD convertor, memory having the input number of the least 16 M (16,777,216) is required.

Therefore, requests for new measurement method for vibration displacement have consistently increased, which can overcome the limit of the traditional method.

PRIOR DOCUMENTS

Patent Documents

KR 2013-0030156 (Mar. 26, 2013)
U.S. Pat. No. 5,028,137 (Jul. 2, 1991)

Non-Patent Document

ISO 16063-15 Methods for the correction of vibration and shock transducers—Part 15: Primary angular vibration correction by laser interferometry (Aug. 1, 2006)

DISCLOSURE

Technical Problem

Accordingly, the present invention is introduced to solve existing technical problem mentioned above. The present invention is aimed at providing measurement method for vibration displacement using state variation principle which achieves real time implementation through super high-speed DSP or FPGA as well as improves precision as much as picometer level and at the same time saves memory capacity compared to conventional invention.

Technical Solution

The present invention provides method for measuring vibration displacement using state variation principle to achieve the purpose mentioned above, which relates to a vibration displacement measuring method using an electrical signal output from a light sensor, the electrical signal output being generated by overlapping a reference laser beam reflected from a fixed reference side and a laser beam reflected from an object whose vibration displacement is measured, comprising a step of discretization, discretizing a cosine signal and a sine signal in the electrical signal output according to index n (n=1, 2, ..., N); a step of correction, correcting an oval type signal formed by the cosine signal and the sine signal to a circle type signal by using a Heydemann correction method; a step of calculation of relative angle, calculating relative angle between the n-th index and the n−1-th index by using the corrected cosine signals and corrected sine signals at the n-th index and the n−1-th index; a step of correction and realignment, correcting and realigning the corrected cosine signals and the corrected sine signals at the n-th index and at the n−1-th index by using the relative angle; a step of calculation of phase, calculating a phase at the n-th index by summing the relative angles accumulated from the first index to the n-th index; and a step of calculation of displacement, converting the phase at the n-th index into a vibration displacement at the n-th index.

At this time, the cosine signal and the sine signal in the electrical signal output from the light sensor by vibration displacement d are expressed as follows, $$u_C(d) = R\cos\left(4\pi N_B \frac{d}{\lambda}\right) + p, \text{ and}$$

$$u_S(d) = \frac{R}{r}\sin\left(4\pi N_B \frac{d}{\lambda} - \alpha\right) + q$$

(R: Voltage, r: ratio of sine signal to cosine signal, λ: laser wavelength (m), NB: reflection times of beam for measurement (single reflection $N_B$=1, double reflection $N_B$=2), α: quadrature error angle of cosine and sine signals, p, d: DC voltage (offset voltage, V) of cosine and sine signals); wherein, in the step of discretization, the cosine signal ($u_C$) and the sine signal ($u_S$) measured at each predetermined measurement cycle are discretized according to index n (n=1, 2, ..., N);
wherein, in the step of correction, the Heydemann correction method uses the following formula, $$\begin{bmatrix} u_c^2(1) & u_s^2(1) & u_c(1)u_s(1) & u_c(1) & u_s(1) \\ u_c^2(2) & u_s^2(2) & u_c(2)u_s(2) & u_c(2) & u_s(2) \\ \vdots & \vdots & \vdots & \vdots & \vdots \\ u_c^2(N) & u_s^2(N) & u_c(N)u_s(N) & u_c(N) & u_s(N) \end{bmatrix} \begin{bmatrix} A \\ B \\ C \\ D \\ E \end{bmatrix} = \begin{bmatrix} 1 \\ 1 \\ 1 \\ \vdots \end{bmatrix},$$

wherein the constants from A to E of the formula above are calculated by the least square method and the factors {R, r, α, p, q} of the cosine signal ($u_C$) and the sine signal ($u_S$) are calculated using the following formula, $$\alpha = \arcsin\left(\frac{C}{2\sqrt{AB}}\right), r = \sqrt{B/A}, p = \frac{2BD - EC}{C^2 - 4AB}, q = \frac{2AE - DC}{C^2 - 4AB}$$

-continued $$R = \frac{1}{\cos\alpha}\left(\frac{1}{A} + p^2 + r^2q^2 + 2rpq\sin\alpha\right)^{1/2};$$

and wherein the cosine signal ($u_C$) and the sine signal ($u_S$), which are oval type, are converted to the corrected cosine signal ($C_C$) and the corrected sine signal ($Cs$) using the following formula, which are circle type, $$C_c(d) = R\cos\left(4\pi N_B \frac{d}{\lambda}\right)$$

and $$C_s(d) = R\sin\left(4\pi N_B \frac{d}{\lambda}\right).$$

Also, in the step of calculation of relative angle, after the step of discretization that the cosine signal ($u_C$) and the sine signal ($u_S$) measured at every predetermined measurement cycle are discretized according to index n (n=1, 2, . . . , N) and the step of correction that the cosine signal ($u_C$) and the sine signal ($u_S$) are converted to the corrected cosine signal ($C_C$) and the corrected sine signal ($Cs$), the relative angle ($\Delta\theta$) between the moments at the n-th index and the n−1-th index is calculated according to the following formula, $$\begin{bmatrix} \cos(\Delta\theta(n)) \\ \sin(\Delta\theta(n)) \end{bmatrix} = \frac{1}{R^2}\begin{bmatrix} C_C(n-1)C_C(n) + C_S(n-1)C_S(n) \\ -C_S(n-1)C_C(n) + C_C(n-1)C_S(n) \end{bmatrix}$$

(R: Voltage (V)).

At this time, in the step of calculation of relative angle, the relative angle ($\Delta\theta$) is calculated according to the following formula from the values of cosine ($\cos(\Delta\theta)$) and sine ($\sin(\Delta\theta)$) of the relative angle ($\Delta\theta$) calculated from the corrected cosine signal ($C_C$) and the corrected sine signal ($Cs$), $$\Delta\theta = \arctan\left(\frac{\sin(\Delta\theta)}{\cos(\Delta\theta)}\right).$$

Also, in the step of calculation of relative angle, the relative angle ($\Delta\theta$) is calculated from the values of cosine ($\cos(\Delta\theta)$) and sine ($\sin(\Delta\theta)$) of the relative angle ($\Delta\theta$), which is calculated by the corrected cosine signal ($C_C$) and the corrected sine signal ($Cs$), and from a predetermined lookup table that contains a cosign and a sign values at an angle as an input value and a value of angle as an output value corresponding to the input value.

Then, in the step of correction and realignment, after the step of discretization that the cosine signal ($u_C$) and the sine signal ($u_S$) measured at every predetermined measurement cycle are discretized according to index n (n=1, 2, . . . , N), and the step of correction that the cosine signal ($u_C$) and the sine signal ($u_S$) are converted to the corrected cosine signal ($C_C$) and the corrected sine signal ($Cs$), the corrected cosine signal ($C_c(n-1)$) and the corrected sine signal ($C_S(n-1)$) at the n−1-th index are corrected and realigned according to the following formula, $$\begin{bmatrix} C_C(n-1) \\ C_S(n-1) \end{bmatrix} = \begin{bmatrix} C_C(n) & -C_S(n) \\ C_S(n) & C_C(n) \end{bmatrix}\begin{bmatrix} \cos(\Delta\theta(n)) \\ \sin(\Delta\theta(n)) \end{bmatrix}.$$

Also, in the step of calculation of phase the phase ($\theta(n)$) at the n-th index is calculated using the following formula, $$\theta(n) = \sum_{k=1}^{n}\Delta\theta(k)$$

(k: natural number).

Furthermore, in the step of calculation of displacement, the calculated phase ($\theta(n)$) is converted to the vibration displacement using the following formula, $$d(n) = \frac{\lambda}{4\pi \cdot N_B}\theta(n)$$

(n: discretized index, d: displacement, $\theta$: phase, $\lambda$: laser wavelength (m), $N_B$: reflection times of beam for measurement (for a single reflection, $N_B$=1, and for a double reflection, $N_B$=2)).

Advantageous Effects

According to the present invention, when measuring vibration displacement by laser interferometer, the precision level of the measurement can be improved as much as a few picometers to tens of picometers. More detailed, when measuring vibration displacement by a laser interferometer, traditional method faces problems that the precision level should be less than certain level due to errors generated from difference between vibration amplitude values of cosine and sine output from light sensor of interferometer, quadrature error angle, and different DC components, etc. However, the present invention uses Heydemann correction method to correct oval type signal consisting of cosine/sine signals output from light sensor into circle type signal. Since the method fundamentally eliminates reasons of the errors of the traditional method mentioned above, precision of measurement can be improved as a result.

Furthermore, the present invention has not only improved level of precision of measurement, but also effect to save memory for measuring devices. Specifically, as mentioned above, the present invention corrects signals and calculates phase and displacement base on principle of a Heydemann correction method, but the present invention also uses new principle applied from the principle of the Heydemann correction method, to measure relative phase, and calculates displacement. Therefore, unlike the traditional method that uses 4 quadrants of memory in a range of 360 degrees, the present invention is possible to calculate enough phase and displacement with one quadrant of memory within a range of 30 degrees. Accordingly, traditional method requires about 4 quadrants in a range of 360 degrees of memory to save data to establish lookup table for light sensor output signal—phase calculation, but the present invention requires one quadrant (a range from 0 to 90 degrees) in maximum or less (a range from 0 to 30 degrees) of memory to save data. Therefore, storage amount of memory can be reduced by at least a quarter to a twelfth of the traditional one.

Also, since the present invention, as mentioned above, corrects and realigns coordinate transformation value corresponding to estimate value of relative angle to reduce error from the relative angel during the course of calculating phase from light sensor output signal, unintentionally accumulated errors due to the limited significant digits can be remarkably reduced. Absolutely, it can be expected that measurement precision will be improved by reducing the error.

DESCRIPTION OF DRAWINGS

FIG. 3 is a comparative example calibrating oval type signal to circle type signal by using a Heydemann correction method.

FIG. 4 is a schematic diagram of conversion model of the Heydemann correction method.

FIG. 5 is a method for calculating relative angle between present position and previous position changed during a short time.

FIG. 6 shows relation between voltage R and incorrect phase according to finite resolution of AD convertor.

FIG. 7 is Simulink's top model for real time measurement of vibration displacement FIG. 8 is a sub-model of laser interferometer light output digital input consisting of AD convertor with two channels.

FIG. 9 is a sub-model of factor input of the Heydemann correction model.

FIG. 10 is Simulink's sub-model for the Hyedemann correction calculation.

FIG. 11 is a sub-model of state transition calculating cosine and sine components of relative phase.

FIG. 12 is a sub-model of phase measurement measuring relative phase and calculating accumulated angles and displacement.

FIG. 13 is Simulink's sub-model correcting next position and calculating realignment.

FIG. 14 is 160 Hz vibration displacement signal measured by the FPGA for real time vibration displacement measurement.

FIG. 15 is Simulink's top model for real time performance of simplified vibration displacement measurement consisting of 5 sub-models.

FIG. 16 is a sub-model of phase measurement for simplified vibration displacement measurement.

FIG. 17 is a measurement apparatus of real time vibration displacement based on the FPGA.

LIST OF REFERENCE NUMERAL

Figure 1:
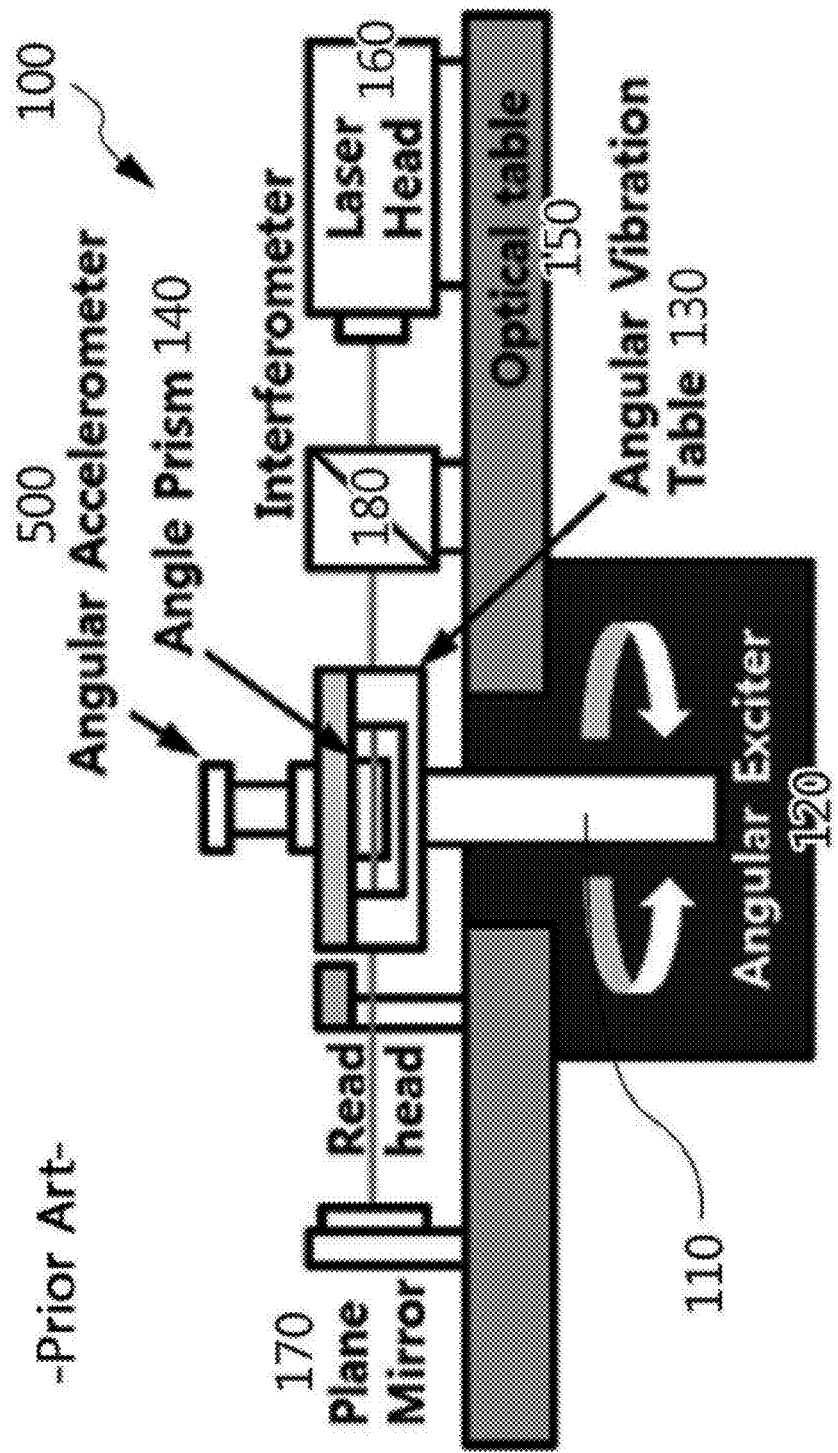
FIG. 1 is a simple block diagram of KRISS angular vibration primary correction system.

100: primary correction device
110: rotation axis
120: angular exciter
130: angular vibration table
140: angle prism
150: optical table
160: laser head
170: phase mirror
180: interferometer
500: Object

[MODE FOR INVENTION] OR EXEMPLARY EMBODIMENT

The following is details for configuration mentioned above about measurement method for vibration displacement using state variation principle of the present invention based on drawings attached.

[1] Heydemann Correction Method

When measuring vibration displacement by using a laser interferometer, as illustrated above, a laser beam for measuring vibration displacement and a laser beam reflected from a fixed reference side stopped are overlapped with each other and are sent to the interferometer comprising light sensor, and then cosine signal $u_c(d)$ and sine signal $u_s(d)$, which is respectively a cosine component and a sine component of electrical output according to vibration displacement by the light sensor, may be taken. However, as mentioned above, if phase and displacement of vibration are calculated by using the cosine and sine signals, errors from difference of vibration amplitude between cosine/sine signals, quadrature error angle, and different DC components, etc. cause precision of measurement not to be less than a certain limit (more specifically, level of tens of picomemter), and mass memory is required to establish a lookup table to convert phase into displacement.

The present invention not only uses the Heydemann correction method principle, but also uses beneficial features discovered from the principle to develop new improved method for measuring phase. In order to help understand the method for measuring phase of the present invention, Heydemann correction method is explained as follows.

Cosine signal which is cosine component electrically output from light sensor and sine signal which is sine component electrically output according to vibration displacement is described as the following formula (1).

$$u_C(d) = R\cos\left(4\pi N_B \frac{d}{\lambda}\right) + p \quad u_S(d) = \frac{R}{r}\sin\left(4\pi N_B \frac{d}{\lambda} - \alpha\right) + q, \quad (1)$$

R: voltage (V)
r: Ratio of sine signal to cosine signal
λ: laser wavelength (m)
$N_B$: reflection times of beam for measurement (single reflection $N_B$=1, double reflection $N_B$=2)
α: quadrature error angle of cosine and sine signals
p, q: DC voltage (offset voltage, V) of cosine and sine signals.

The formula (1) shows an oval that a central point, ratio r of major axis and minor axis, or major axis or minor axis is inclined as angle a. Measurement of displacement d using the oval is a main reason to disturb improvement of precision of measuring displacement d. Therefore, in order to measure high-precisely displacement as much as a few picometers to tens of picometers, the oval with diameter R of the formula (1) is necessarily converted to signal having circle type. A formula (2) to convert the oval of the formula (1) into circle is as follows.

$$(u_C(d) - p)^2 + \left(\frac{r(u_S(d) - q) + (u_C(d) - p)\sin\alpha}{\cos\alpha}\right)^2 = R^2 \quad (2)$$

Cosine signal $C_C$ and sine signal $C_S$ which are corrected as a circle with diameter R by using the formula (2) are shown as the following formula (3).

$$C_c(d) = R\cos\left(4\pi N_B \frac{d}{\lambda}\right) \quad C_s(d) = R\sin\left(4\pi N_B \frac{d}{\lambda}\right), \quad (3)$$

Method to convert a formula as the formula (1) comprising amplitude vibration between cosine and sine signals is different, those signals have quadrature error angle, and oval type signal with different DC components into corrected circle type signal was introduced by Heydemann in 1981, so the correction method, Heydemann correction method, was named after his own name.

An example of Heydemann correction method applied to actual correction is as follows. First power is supplied to a laser light source, and after light wavelength is stable, an user supplies standard vibration (e.g. 16 Hz, 100 m/s²). Then by precise digital oscilloscope or ultra high-speed AD (analog-to-digital) convertor, cosine signal and sine signal, which are signals electrically output from a light sensor, are measured. The measured signals are shown as discontinuous digital values not continuous analog values, i.e. time series signal measured at every certain time and the least squares method is applied to this time series signal for correction. Specifically, the formula (2) is converted into a formula such as the following formula (4) described with 5 constants, A to E.

$$Au_C^2(n) + Bu_S^2(n) + Cu_C(n)u_S(n) + Du_C(n) + Eu_S(n) = 1 \quad (4)$$

Constants A to B of the formula above are specified as factors of the formula (2) as shown in the formula (5).

$$A = (R^2 \cos^2\alpha - p^2 - r^2 q^2 - 2rpq \sin \alpha)^{-1}$$

$$B = Ar^2$$

$$C = 2Ar \sin \alpha$$

$$D = -2A(p + rq \sin \alpha)$$

$$E = -2Ar(rq + p \sin \alpha) \quad (5)$$

Constants A to E are calculated by solution specifying matrix as shown in the following formula (6), i.e. the least squares method.

$$\begin{bmatrix} u_c^2(1) & u_s^2(1) & u_c(1)u_s(1) & u_c(1) & u_s(1) \\ u_c^2(2) & u_s^2(2) & u_c(2)u_s(2) & u_c(2) & u_s(2) \\ \vdots & \vdots & \vdots & \vdots & \vdots \\ u_c^2(N) & u_s^2(N) & u_c(N)u_s(N) & u_c(N) & u_s(N) \end{bmatrix} \begin{bmatrix} A \\ B \\ C \\ D \\ E \end{bmatrix} = \begin{bmatrix} 1 \\ 1 \\ 1 \\ \vdots \end{bmatrix} \quad (6)$$

In the formula above, if it is assumed that there are matrix 5×N of the left side, M, 5×1 vector of the left side, $V_P$ consisting of factors to be calculated A to E, and 5×1 vector of the right side, $V_1$ consisting of every value 1, values from A to E will be calculated as follows, $$V_P = (M^T \cdot M)^{-1} \cdot M^T \cdot V_1 \quad (7)$$

According to the formula above, superscript T indicates transpose operator of the matrix, and −1 indicates inverse matrix, respectively. If constants, A to E, calculated with the formula above are calculated again by substituting them to the formula (5), values, R, r, α, p, q, given to the formula (2) are finally calculated like the following formula (8).

$$\alpha = \arcsin\left(\frac{C}{2\sqrt{AB}}\right), r = \sqrt{B/A}, p = \frac{2BD - EC}{C^2 - 4AB}, \quad (8)$$

$$q = \frac{2AE - DC}{C^2 - 4AB}$$

$$R = \frac{1}{\cos\alpha}\left(\frac{1}{A} + p^2 + r^2 q^2 + 2rpq \sin\alpha\right)^{1/2}$$

Since the calculated values R, r, α, p, q, are index describing specific output feature of optical system of laser interferometer, information, which is very useful to optical system arrangement and state diagnosis included in laser interferometer, is provided. FIG. 3 shows an example that a distorted oval as formula (1) is converted into circular signal as formula (3) by suing Heydemann correction system. That is, it proves that by using Heydemann correction method, cosine and sine signals (signals of the formula (1)) having different vibration amplitude, quadrature error angles, and different DC components may be corrected into circle type signals (signals of the formula (3)) having same vibration amplitude, 90 degrees phase difference between two signals, and no DC component. FIG. 4 simply describes a conversion model of course to calibrate oval type signals measured in laser interferometer into circle type signals by applying Heydemann correction method mentioned above and using factors R, r, α, p, q through the least squares method.

[2] Measurement Method for Relative Phase and Displacement Using State Variation Principle The present invention suggests new phase measurement method based on signal corrected as circle type (i.e. signal specified as the formula (3), FIG. 3(B)) by applying the Heydemann correction method. The details about the method are as follows.

If circle type signal corrected is based like the formula (3), the time is t in the present displacement d. After a short time (or sampling cycle) Δt (t+Δt time), when the change is performed as much as small displacement δ, corrected cosine and sine signals are specified as follows, $$C_C(d + \delta) = R\cos\left(4\pi N_B \frac{d}{\lambda}\right)\cos\left(4\pi N_B \frac{\delta}{\lambda}\right) - R\sin\left(4\pi N_B \frac{d}{\lambda}\right)\sin\left(4\pi N_B \frac{\delta}{\lambda}\right) \quad (9)$$

$$C_S(d + \delta) = R\sin\left(4\pi N_B \frac{d}{\lambda}\right)\cos\left(4\pi N_B \frac{\delta}{\lambda}\right) + R\cos\left(4\pi N_B \frac{d}{\lambda}\right)\sin\left(4\pi N_B \frac{\delta}{\lambda}\right)$$

Thus, when the change is performed as much as small displacement δ, cosine and sine signals are expressed like the following matrix.

$$\begin{bmatrix} C_C(d + \delta) \\ C_S(d + \delta) \end{bmatrix} = \begin{bmatrix} C_C(d) & -C_S(d) \\ C_S(d) & C_C(d) \end{bmatrix} \begin{bmatrix} \cos\left(4\pi N_B \frac{\delta}{\lambda}\right) \\ \sin\left(4\pi N_B \frac{\delta}{\lambda}\right) \end{bmatrix} \quad (10)$$

Since $C_C$ and $C_S$ are, as mentioned above, circle type signals and R is a fixed value, therefore, $C_C$ and $C_S$ can be calculated as coordinate on the circumference with the rotation angle. On the other hand, with coordinate of two points on the circumference, the angle between the two points can be easily calculated. In other words, as shown in the formula (10), the present cosine and sine signals shifted as much as small displacement δ can be always described with coordinate conversion of cosine and sine signals in the previous point by rotation as much as small angle. On the circumference with radius R, rotation angle for coordinate conversion corresponding to small displacement δ is as follows, $$\Delta\theta = 4\pi N_B \frac{\delta}{\lambda} \quad (11)$$

Like the formula (11), modifying relation between the present positions ($C_C(d+\delta)$, $C_S(d+\delta)$) on the circumference and the previous positions ($C_C(d)$, $C_S(d)$) is defined as rotation angle included in small displacement. This is actually the result by applying state variation principle and in the present invention, that is basic principle to calculate relative displacement by measuring rotation angle changed between two points. If cosine and sine components related to the rotation angle of the formula (10) are assumed as $\cos(\Delta\theta)$ and $\sin(\Delta\theta)$, respectively, the two components are calculated as coordinate values of present one and previous one as follows, $$\begin{bmatrix} \cos(\Delta\theta) \\ \sin(\Delta\theta) \end{bmatrix} = \begin{bmatrix} \cos\left(4\pi N_B \frac{\delta}{\lambda}\right) \\ \sin\left(4\pi N_B \frac{\delta}{\lambda}\right) \end{bmatrix} = \qquad (12)$$

$$\frac{1}{R^2}\begin{bmatrix} C_C(d)C_C(d+\delta) + C_S(d)C_S(d+\delta) \\ -C_S(d)C_C(d+\delta) + C_C(d)C_S(d+\delta) \end{bmatrix}$$

Through the values of cosine and sine calculated by the formula (12), relative angle $\Delta\theta$ and small displacement $\delta$ are calculated as follows, $$\Delta\theta = \arctan\left(\frac{\sin(\Delta\theta)}{\cos(\Delta\theta)}\right) \qquad (13)$$

$$\delta = \frac{\lambda}{4\pi N_B}\Delta\theta$$

With signals digitalized by using the principle mentioned above, the following calculation may be applied. In the present displacement d, the time is $t_n=n\Delta t$, and at that time, position on the circumference is ($C_C(n)$, $C_S(n)$). For the present displacement, in the previous displacement (shown as d−δ of the formula above) as much as short time (or sampling cycle) $\Delta t$, the time is $(n-1)\Delta t$, and position on the circumference is ($C_C(n-1)$, $C_S(n-1)$). Relative angle $\Delta\theta(n)$ and radius R of circular signal from the present position and previous position may be calculated in the same manner of the formulas (9) to (13). In the actual calculation, using the formulas above, calculation may be performed by arctangent function and square root function, or by using lookup table of two functions, calculation may be performed. FIG. 5 shows modeling example of relative angel calculation method between present position and previous position changed during a short time.

This relative angle $\Delta\theta$ may be calculated related to each n (=1, 2, . . . , N), phase $\theta$ on the certain n may be calculated by adding up $\Delta\theta$s from 1 to n. This calculated phase $\theta$ is substituted to the formula (A) for conversion of phase-displacement mentioned above to calculate the final actual vibration displacement. The details are as follows.

As shown in the FIG. 5, when relative angle $\Delta\theta(n)$ is estimated by using lookup table, this value is an approximate value within limited significant digits given to the formula (13). Accordingly, it is possible for error out of the significant digits to exist, but the present invention, to eliminate the error, performs the course of rearrangement by correcting coordinate conversion value corresponding to estimated value of relative angle $\Delta\theta(n)$ again. That is, by using the following formula such as the formula (14), previous coordinate ($C_C(n-1)$, $C_S(n-1)$) is corrected and saved as shifted coordinate as much as relative angle $\Delta\theta(n)$ estimated from the present coordinate ($C_C(n)$, $C_S(n)$).

$$\begin{bmatrix} C_C(n-1) \\ C_S(n-1) \end{bmatrix} = \begin{bmatrix} C_C(n) & -C_S(n) \\ C_S(n) & C_C(n) \end{bmatrix}\begin{bmatrix} \cos(\theta(n)) \\ \sin(\Delta\theta(n)) \end{bmatrix} \qquad (14)$$

This method to correct and rearrange previous coordinate on the circumference is effective method to reduce accumulated errors related to relative angle $\Delta\theta(n)$ estimated at each time.

Lastly, by using relative angle $\Delta\theta(n)$ calculated in the present position ($C_C(n)$, $C_S(n)$) and the previous position ($C_C(n-1)$, $C_S(n-1)$) on the circumference, accumulated phase $\theta(n)$ at the present position is calculated as the following formula (15) by adding up the relative angles accumulated.

$$\theta(n) = \sum_{k=1}^{n}\Delta\theta(k) \qquad (15)$$

Like the formula (15), if accumulated phase $\theta(n)$ calculated is substituted to the formula (A), which is phase-displacement conversion formula mentioned above, the result may be the present displacement d(n). In short, the present invention describes that first, at two positions ($C_C(n)$, $C_S(n)$) and ($C_C(n-1)$, $C_S(n-1)$) on the circumference, relative angle $\Delta\theta(n)$ is calculated, second, the present displacement d(n) is calculated by using the sum $\theta(n)$ of series of relative angles calculated.

Therefore, the present invention, by using Heydemann correction method, converts oval type voltage signal measured from light sensor into circle type, and calculate vibration displacement therefrom. Furthermore, by using present position and previous position on the circumference, small size relative angel between both positions is calculated and finally the accumulated relative angles are calculated as all rotation angles and vibration displacement.

As explained above, when measurement is performed by light sensor, actually cosine/sine signals are received. As shown in the FIG. 4, traditionally, cosine/sine signals are digitalized and substituted to lookup table to calculate phase $\theta$, and therefrom vibration displacement d by using the formula (A). About this, the traditional method has problems. First, actually, since the cosine/sine signals are not circle type but oval type, precision is reduced by errors thereby. Second, even though the signal is calibrated as circle type by applying Heydemann correction method, which is a well-known method, since as shown in the lookup table of the FIG. 4, $\theta$ should be saved in lookup table whenever values are within 0~360 degrees, excessive amounts of memory are required.

On the other hand, the present invention uses Heydemann correction method, but further suggests upgrade phase measurement method to solve problems mentioned above. That is, the present invention, by using Heydemann correction method, corrects oval type signal to circle type signal, but by using cosine/sine signal included in previous position and cosine/sine signals included in present position, small sized relative angle $\Delta\theta$ changed between the previous position and the present position is calculated. In the course of calculating this relative angle, if lookup table is used, in the traditional method, values within a range from 0 to 360 degrees, i.e. within a full range of angles should be saved in the lookup table, but in the present invention, since only relative angle is calculated, at most, values within one quadrant, i.e. within a range from 0 to 90 degrees are saved in the lookup table. Actually, considering size of small displacement during the short time when measuring vibration, it is enough to save only values within a range from 0 to 30 degrees. In other words, compared to existing lookup table, (if only values of one quadrant are saved), the memory capacity can be saved from a quarter to a twelfth (if only values within a range from 0 to 30 degrees are saved) of the existing amount.

Also, as mentioned above, to avoid errors are accumulated due to significant digits during the process of calculating relative angle, as shown in the formula (14), previous coordinate is corrected and rearranged by using present coordinate and relative angle value. Accordingly, although errors less than significant digits occur, since the errors are not accumulated, the size of errors generated when calculating phase value at the present position, which is calculated as accumulated value of relative angle, can be reduced.

According to the present invention, the precision is improved by calibrating signal itself input by applying principle of Heydemann correction method; memory capacity of lookup table, which is necessary for calculation, can be reduced by calculating relative angle; and errors also decrease since the main reasons of the errors are eliminated by correcting and rearranging the previous coordinate. Ultimately, it means that with an even smaller amount of memory compared to the traditional one, precision of measurement can be improved.

To summarize measurement method for vibration displacement of the present invention explained above is as follows. Measurement method for vibration displacement of the present invention is basically configured to use laser interferometer, to overlap laser beam reflected from an object where angular vibration occurs with standard laser beam reflected from fixed reference side, to input those beams to light sensor, and to calculate vibration displacement of the object by using electrical signal output from the light sensor.

i) First of all, in the step of discretization, the electrical output cosine signal and sine signal are dicretized according to the index n (n=1, 2, . . . , N). It is not essential to discretize signal output from an object if the signal is digital signal already discretized, but since generally the object for vibration displacement of the present invention is a kind of vibration sensors such as angular accelerometer, there are many cases that the output signals are continuous analog signals. To calculate these analog signals by computer, the signals are digitalized through the step of discretization, and of course, the sampling cycle can be properly determined by a user. As explained above, in short, when, by vibration displacement d, cosine signal ($u_C$) and sine signal ($u_S$) electrically output from the light sensor are as follows, $$u_C(d) = R\cos\left(4\pi N_B \frac{d}{\lambda}\right) + p \quad u_S(d) = \frac{R}{r}\sin\left(4\pi N_B \frac{d}{\lambda} - \alpha\right) + q,$$

(R: voltage level (V), r: ratio of sine signal to cosine signal, $\lambda$: laser wavelength (m), $N_B$: reflection times of beam for measurement (single reflection $N_B$=1, double reflection $N_B$=2), $\alpha$: quadrature error angle of cosine and sine signals, p, q: DC voltage (offset voltage, V) of cosine and sine signals)

At every time of predetermined measurement cycle (i.e. sampling cycle), the cosine signal ($u_C$) and the sine signal ($u_S$) are discretized according to the index n (n=1, 2, . . . , N), and then those are made as time series signals such as $u_C(n)$ and $u_S(n)$ discretized according to n.

ii) In the step of correction, oval type signal formed by the cosine signal and the sine signal is corrected to circle type signal by using a Heydemann correction method. The above formulas (1) to (8) explain this correction step. In short, according to the Heydemann correction method, $$\begin{bmatrix} u_c^2(1) & u_s^2(1) & u_c(1)u_s(1) & u_c(1) & u_s(1) \\ u_c^2(2) & u_s^2(2) & u_c(2)u_s(2) & u_c(2) & u_s(2) \\ \vdots & \vdots & \vdots & \vdots & \vdots \\ u_c^2(N) & u_s^2(N) & u_c(N)u_s(N) & u_c(N) & u_s(N) \end{bmatrix} \begin{bmatrix} A \\ B \\ C \\ D \\ E \end{bmatrix} = \begin{bmatrix} 1 \\ 1 \\ 1 \\ \vdots \end{bmatrix}$$

Constants from A to E of the formula above are calculated by the least squares method, $$\alpha = \arcsin\left(\frac{C}{2\sqrt{AB}}\right), r = \sqrt{B/A}, p = \frac{2BD - EC}{C^2 - 4AB}, q = \frac{2AE - DC}{C^2 - 4AB}$$

$$R = \frac{1}{\cos\alpha}\left(\frac{1}{A} + p^2 + r^2q^2 + 2rpq\sin\alpha\right)^{1/2}$$

and the factors {R, r, $\alpha$, p, q} of the cosine signal ($u_C$) and sine signal ($u_S$) are calculated to covert and correct the cosine signal ($u_C$) and the sine signal ($u_S$) which are over type to corrected cosine signal ($C_C$) and the corrected sine signal ($C_S$) which are circle type as the following formula, $$C_C(d) = R\cos\left(4\pi N_B \frac{d}{\lambda}\right) \quad C_S(d) = R\sin\left(4\pi N_B \frac{d}{\lambda}\right)$$

iii) In the step of calculation of relative angle, cosine signal and sine signal corrected at the n-th index, and cosine signal and sine signal corrected at the n−1-th index are used to calculate the relative angle between two indexes. The formulas (9) to (13) are about this step. In short, as explained above, by using values at the n-th index and the n−1-th index at which cosine/sine signals are discretized and corrected, the relative angle ($\Delta\theta$) between the n-th index and the n−1-th index is calculated based on the following formula.

$$\begin{bmatrix} \cos(\Delta\theta(n)) \\ \sin(\Delta\theta(n)) \end{bmatrix} = \frac{1}{R^2}\begin{bmatrix} C_C(n-1)C_C(n) + C_S(n-1)C_S(n) \\ -C_S(n-1)C_C(n) + C_C(n-1)C_S(n) \end{bmatrix}$$

More specifically, as explained in the formula (13), from cosine value ($\cos(\Delta\theta)$) and sine value ($\sin(\Delta\theta)$) of the relative angle ($\Delta\theta$) calculated by corrected cosine signal ($C_C$) and corrected sine signal ($C_S$), the relative angle ($\Delta\theta$) is calculated based on the following formula.

$$\Delta\theta = \arctan\left(\frac{\sin(\Delta\theta)}{\cos(\Delta\theta)}\right)$$

In real calculations, the arc-tangent function and square root function, etc. may be directly applied, but for calculation of digital signal, generally to increase the speed of calculation, lookup table is used. That is, by using the lookup table which is a prepared data that input value is values of cosine and sine at certain angle, output value is angle value, input values of cosine ($\cos(\Delta\theta)$) and sine ($\sin(\Delta\theta)$) of the relative angle ($\Delta\theta$) to the lookup table so as to calculate relative angle ($\Delta\theta$). As mentioned above, since the present invention uses this lookup table related to relative angel, it is enough to have lookup table data with, at most, a range of from 0 to 90 degrees (within a quadrant), and considering vibration displacement and phase which actually occur, a range from 0 to 30 degrees. Therefore, compared to traditional lookup table data with a range from 0 to 360 degrees, the storage capacity of the lookup table data is reduced by a quarter to a twelfth of the traditional one iv) In the step of correction and realignment, by using cosine signal and sine signal corrected at the n-th index, and relative angle, cosine signal and sine signal corrected at the n−1-th index are corrected and realigned. The formula (14) is about principle of this step of correcting and realigning the previous signal. In short, as mentioned above, by using the calculated relative angle ($\Delta\theta$), cosine signal ($C_C(n)$) and sine signal ($C_S(n)$) corrected at the n-th index, cosine signal ($C_C(n-1)$) and sine signal ($C_S(n-1)$) corrected at the n−1-th index are corrected and realigned.

$$\begin{bmatrix} C_C(n-1) \\ C_S(n-1) \end{bmatrix} = \begin{bmatrix} C_C(n) & -C_S(n) \\ C_S(n) & C_C(n) \end{bmatrix} \begin{bmatrix} \cos(\Delta\theta(n)) \\ \sin(\Delta\theta(n)) \end{bmatrix}$$

In the former step of calculation of relative angle, actually, there exist errors out of range of significant digits based on significant digits, etc. of a lookup table. Since the error itself is minor, it is not a severe problem. However, finally phase and displacement are calculated by adding up relative angles calculated by the formula as will be explained below. Despite errors out of a range of significant digits, since those can be accumulated in the process of calculating phase and displacement, it is possible for the errors to increase much more than expected. However, the present invention causes previous coordinate to be renewed by correction and realignment although errors which are out of a range of significant digits occur when calculating relative angle, the errors are not accumulated during the process of further summing the relative angle. That is, although errors occur in the final calculated phase and displacement, since it is minor which is out of a range of significant digits, precision of measurement can be more improved.

v) In the step of calculation of phase, phase at the n-th index is calculated by summing the relative angle accumulated by the n-th index. The formula (15) explains the principle of this step. In short, as mentioned above, the relative angle is calculated in the step of calculation of relative angle ($\Delta\theta$), and then phase ($\theta(n)$) at the n-th index is calculated based on the following formula.

$$\theta(n) = \sum_{k=1}^{n} \Delta\theta(k)$$

(k: natural number from 1 to n)

vi) Lastly, in the step of calculation of displacement, the phase at the n-th index is calculated by being converted to the vibration displacement at the n-th index. The formula (A) is about the principle of this step. In short, as mentioned above, after phase ($\theta(n)$) at the n-th index is calculated in the step of calculation of phase, it is calculated by being converted to the vibration displacement ($d(n)$) at the n-th index.

$$d(n) = \frac{\lambda}{4\pi \cdot N_B} \theta(n)$$

(n: discretized index, d: displacement, $\theta$: phase, $\lambda$: laser wavelength (m), $N_B$: reflection times of beam for measurement (single reflection $N_B=1$, double reflection $N_B=2$)).

[3] The First Embodiment: Non-Real Time Measured Model

Non-real time embodiment of measurement method for vibration displacement mentioned above is as follows. In short, this is non-real measurement method comprising that by using digital scope or ultra high-speed AD convertor (analog-to-digital convertor), two signals, cosine and sine output from light sensor of laser interferometer are converted to digital values, saved in designated mass memory, and after sending the saved cosine and sine signals to user's PC, the displacement is calculated according to the formulas from (9) to (14). Although the detailed process is almost same with measurement method described above, more details are explained as follows.

(1) Stabilization of wavelength of light source during enough time after power is supplied to the laser light sensor (2) By supplying standard vibration, cosine signal and sine signal, which are cosine/sine components of electrical signals output from the light sensor, are collected and saved in mass memory as time series signals $\{u_{COS}(n), u_{SIN}(n); n=1, 2, \ldots, N\}$, by using precise digital storage oscilloscope or ultra high-speed AD convertor.

(3) By using cosine and sine signals collected by the digital storage oscilloscope or ultra high-speed AD convertor, through a Heydemann method described in the formulas (4) to (8), the factors, $\{R, r, \alpha, p, q\}$, of the light sensor output of the laser interferometer are calculated and saved.

(4) Cosine and sine signals of cosine/sine components of electrical signals output from the light sensor of the laser interferometer, according to vibration to be measured by user, are collected and saved in mass memory as time series signals $\{u_{COS}(n), u_{SIN}(n); n=1, 2, \ldots, N\}$, by using precise digital storage oscilloscope or ultra high-speed AD convertor.

(5) Cosine and sing time series signals $\{u_{COS}(n), u_{SIN}(n); n=1, 2, \ldots, N\}$ saved in mass memory of the digital storage oscilloscope or the ultra high-speed AD convertor are sent to the user's PC.

(6) The factors, $\{R, r, \alpha, p, q\}$, of the laser interferometer and the light sensor output calculated and saved before and calculated model of the FIG. 4 are used to convert the light sensor's voltage measurement signals, $\{u_C(n), u_S(n); n=1, 2, \ldots, N\}$, to corrected voltage signals, $\{C_C(n), C_S(n); n=1, 2, \ldots, N\}$.

(7) The corrected signals, $\{C_C(n), C_S(n); n=1, 2, \ldots, N\}$ are used to calculate cosine and sine components, $\{\cos(\Delta\theta(n)), \sin(\Delta\theta(n)); n=2, \ldots, N\}$, which are relative phase, according to the following formula (16). (See, FIG. 5)

$$\begin{bmatrix} \cos(\Delta\theta(n)) \\ \sin(\Delta\theta(n)) \end{bmatrix} = \frac{1}{R^2} \begin{bmatrix} C_C(n-1)C_C(n) + C_S(n-1)C_S(n) \\ -C_S(n-1)C_C(n) + C_C(n-1)C_S(n) \end{bmatrix} \quad (16)$$

(8) With the calculated cosine and sine components $\{\cos(\Delta\theta(n)), \sin(\Delta\theta(n)); n=2, \ldots, N\}$, like the formula (13), relative phase, $\{\Delta\theta(n); n=2, \ldots, N\}$, is calculated by using arc-tangent function. At this point, if the relative angle $\Delta\theta(n)$ is estimated by using a lookup table, the estimated value will be approximate value within limited significant digits of arc-tangent function. Therefore, accumulated errors of a series of relative angles are minimized by correcting present coordinate as much as the estimated relative angle $\theta(n)$ according to the method of the formula (14).

(9) According to the sum of calculated relative phase, i.e. the formula (15), the present phase $\{\theta(n); n=2, \ldots, N\}$ is calculated and by using the calculated present phase, the present displacement $d(n)$ is calculated with formula (A).

In the non-real time measurement method for vibration displacement introduced above, actual recording time of vibration signal depends on configured size of embedded memory and sampling speed of the digital storage oscilloscope or the ultra high-speed AD convertor. However, although the recording time is limited, it can be widely used from measuring normal vibration remaining constant vibration level to measuring excessive response vibration like shock signal. For example, a vibration standard research team formed by inventors of KRISS, who is applicant of the present invention, converted simultaneously cosine/sine signals output from an light sensor of laser interferometer in an analogue manner of laser interferometer, to digital signals and saved them with 4 channels 12 bits digital oscilloscope (Lecroy HDO6054). After saving the signals, the signals were sent to the PC and saved as a file. The saved cosine/sine signal file output from the light sensor measures displacement of vibration signal through displacement calculation process introduced above and performs primary correction of vibration accelerometer by using the measured displacement signal.

Measurement uncertainty of the non-real time measurement method for vibration displacement suggested is from resolution of digital oscilloscope or AD convertor converting cosine and sine signals, which are electrical signals output from the light sensor, to digital values, and round off used in calculation of formulas (12) to (15). Measurement uncertainty based on 12-bit resolution provided by selected digital oscilloscope (Lecroy HDO6054) can be same with voltage measurement uncertainty of vibration amplitude of cosine and sine signals converted to digital values like the FIG. 6, i.e. voltage measurement uncertainty of semi diameter R. Voltage measurement relative standard uncertainty U of AD convertor with $N_b$ bits satisfies feature of uniform distribution as follows, $$U_r(R) = \frac{\sigma(R)}{R} = 2^{-N_b+1}\frac{1}{\sqrt{3}} \quad (17)$$

As described in the FIG. 6, phase uncertainty generated from voltage measurement relative uncertainty is calculated as follows, $$U(\Delta\theta) = \arctan\left(\frac{\sigma(R)}{R}\right) \cong 2^{-N_b+1}\frac{1}{\sqrt{3}} \quad (18)$$

In the formula above, $\sigma()$ function refers to standard deviation. Displacement measurement uncertainty according to phase uncertainty of the formula (18) is calculated by the formula (13) as follows, $$U(d) = \frac{\lambda}{4\pi N_B}U(\Delta\theta) \cong \frac{\lambda}{4\pi N_B}2^{-N_b+1}\frac{1}{\sqrt{3}} \quad (19)$$

With AD convertor, which is 12 bits, $N_b=12$, and interferometer using flat mirror with reflection times, $N_B=2$, displacement measurement uncertainty based on the formula (19) is 7.1 pm (or $5.5\times10^{-5}$ times of laser wavelength k). This means that although AD convertor with 12-bit resolution is used, displacement measurement standard uncertainty less than 10 pm can be calculated.

Measurement uncertainty from round off used in calculation of the formulas (12) to (15) is under level to be ignorable. Since the research team performs calculation of values by using floating point 62-bit (or 8 bytes), calculation errors from round off of 52-bit fraction part occur. The research team performed test of round off uncertainty by preparing calculation program of the formulas (12) to (15), and relative uncertainty level ($U_r(R)$) of vibration amplitude R caused by round off was $2.3\times10^{-12}$. Compared to resolution errors of 12-bit AD convertor, the errors of round off of 62-bit (or 8 bytes) floating point calculation is very small value to be ignored.

[4] The Second Embodiment: Real Time Measured Model

Real time vibration measurement using a light sensor output of laser interferometer can be performed by DSP or FPGA embedding multiple cores for high-speed calculation. From now on, performance using FPGA, which was used in the process of R&D, will be introduced. FPGA model for development consists of Kintex-7 FPGA DSP Kit of Xilinx and 14-bit AD convertor comprising two channels with maximum 250 MHz (FMC 150 of 4DSP). Cosine and sine signals output from a light sensor in an analogue manner are input to two channels 14-bit AD convertor, and then are converted to 14-bit digital values. Through interface bus, the values are sent to the Kintex-7 FPGA DSP in real time.

To minimize time for program development of real time vibration displacement measurement, design method using models of Mathworks and Simulink, were used. The FIG. 7 shows top model (main program) designed by Simulink's model. The top model consists of 6 sub-models, including (1) interferometer quadrature outputs model, (2) a Heydemann model parameters input model, (3) a Heydemann correction model, (4) state transition model detecting and calculating small displacement between two points on circumference, (5) Phase meter model measuring relative phase and calculating accumulated angle and final vibration displacement, and (6) realignment model to minimize accumulated errors. That is, model shown in the FIG. 6 is a non-real time measurement method for vibration displacement with Simulink's model, and this is one of methods for measurement in the FPGA in real time.

(1) Cosine and sine signals output from the light sensor of the laser interferometer, shows, through two channels 14-bit AD convertor described in the FIG. 8, sub-model for digital input, and uses FMC (FPGA Mezzanine Card) interface program providing to FMC 150 board of 4DSP.

(2) As described in the FIG. 4, values of the factors, $\{R, r, \alpha, p, q\}$, of the Heydemann model parameters input model are performed by same process with non-real time measurement process (from steps of (1) to (3)) and saved in user's PC. After that, the 5 factors saved are sent to memory embedded in the FPGA and saved, and those are used for calculation by reading the values as constants when measuring displacement in real time. FIG. 9 shows sub-model for factor input of Heydeman correction model, it is configured for user to choose whether Heydemann correction method is performed or not.

Figure 2:
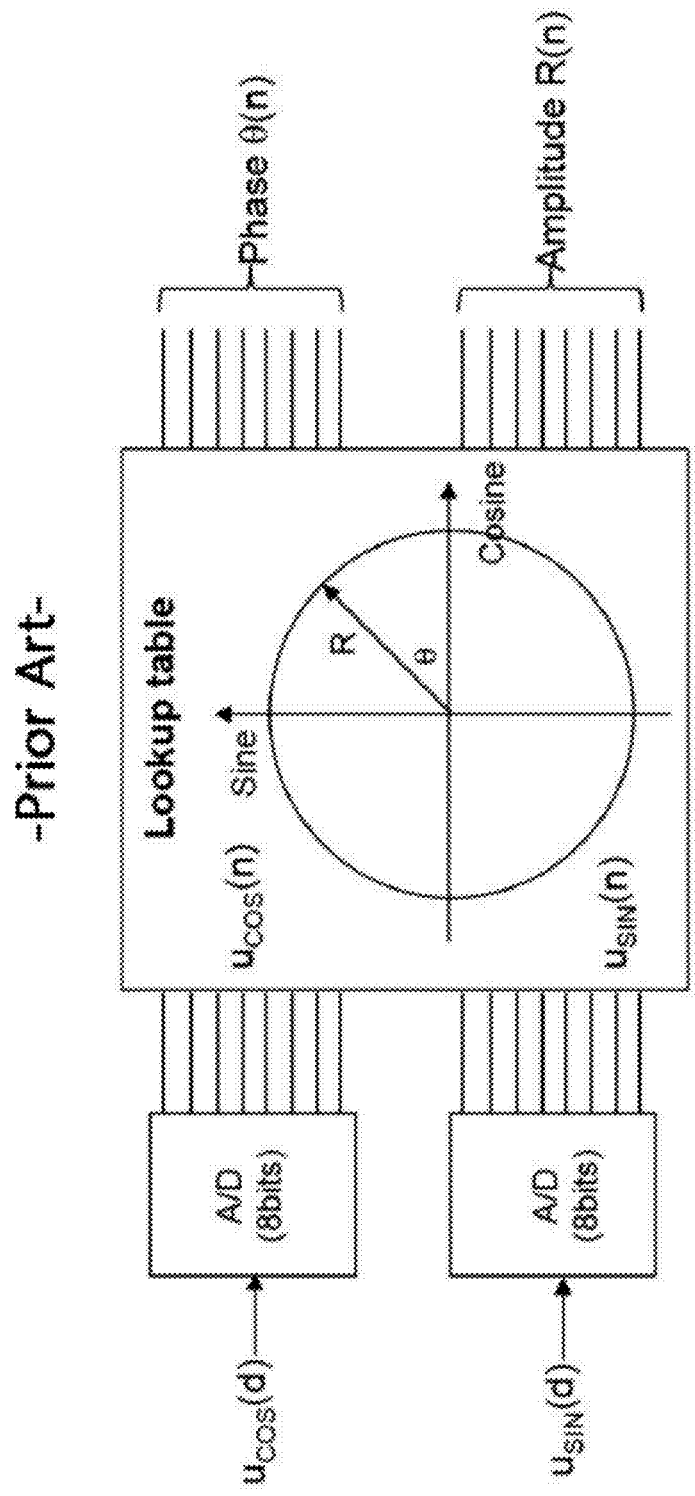
FIG. 2 is a traditional method for measuring phase and vibration amplitude using lookup table.

(3) FIG. 10 shows a Hyedemann correction model. This is Simulink's sub-model performing calculation for the Heydemann correction of the FIG. 2 introduced above.

(4) State transition model, which is the fourth sub-model of the Simulink's top model, shows movement process of cosine and sine signals calculated by the Heydemann correction from previous position ($C_C(n-1)$, $C_S(n-1)$) to prevent position ($C_C(n)$, $C_S(n)$) with Simulink's model. FIG. 11 shows state transition model calculating cosine and sine components of relative phase $\Delta\theta(n)$ according to movement from previous position to present position. Cosine and sine components, which are two output values of the state transition model, of $\Delta\theta(n)$ are input as phase measurement module like FIG. 12.

FIG. 11 shows Simulink's sub-model of phase meter model, which consists of $\Delta\theta(n)$Estimator performing relative phase measurement, phase calculation part calculating accumulated sum of relative phases, and output part calculating final displacement by using present phase and outputting the value. $\Delta\theta(n)$Estimator is calculation program made by matlab code, and function for calculation of arc-tan $(\sin(\Delta\theta(n))/\cos(\Delta\theta(n)))$.

(5) Phase meter model is output to the outside to correct and realign present position when present relative phase $\Delta\theta(n)$ measures relative phase in the next step. (See, output point 2 delta-theta of FIG. 12)

(6) FIG. 13 is sub-model of Similink to perform calculation of correction and realignment (See, the formula 14) of previous position to minimize impact of errors from calculation of estimated relative phase angle $\Delta\theta$ of previous state.

Each of motlab functions is applied to Simulink's model for real time measurement described in FIGS. 12 and 13. Matlab function of the FIG. 12 is function comprising matlab code performing arctan 2 $(\sin(\Delta\theta(n)), \cos(\Delta\theta(n)))$, which is trigonometrical function, by 18-bit CORDIC method, and matlab function of the FIG. 13 is function as ultra high-speed calculation matlab code by performing trigonometrical function $(\sin(\Delta\theta(n)), \cos(\Delta\theta(n)))$ with lookup table and Taylor series. These methods with matlab functions have been developed to make impossible part of Simulink's model to be performed in real time be possibly performed in real time in the FPGA.

Top model of Simulink (Simulink's top model shown in the FIG. 7) consisting of 6 sub-models described in FIGS. 8 to 13 was converted at the first time through program of the VHDL language, and after it was converted as image file for kintex-7 FPGA program by using FPGA DSP kit (Vivado) of Xilinx, the image was sent to EEPROM for FPGA for development and saved. When the power of FPGA was on, FPGA program image was automatically uploaded in the EEPROM and program setting of the FPGA was finished. If user sends vibration measurement command to the FPGA, the result measuring vibration displacement in the FPGA is sent to the user's PC by using FIFO memory in real time.

FIG. 14 shows an example of vibration displacement measured from the FPGA for real time vibration displacement measurement. It was seen that the suggested Simulink's model for real time vibration displacement measurement is normally operated in Kintex-7 FPGA.

Since Resolution of AD convertor used for real time vibration displacement measurement provides effect improved by 2-bit compared to non-real time measurement, vibration displacement measurement standard uncertainty based on resolution of AD convertor was 1.8 pm, which is about 4 times clearer than that from non-real time measured method. And if 62-bit (8 byte) floating points data used for non-real time displacement measurement introduced above was used for calculation of the formulas (12) to (15), it was, in fact, impossible to perform real time measurement using inner resources of the FPGA. To accomplish real time performance using FPGA embedded DSP resource of Kintex-7 series, Slmulink's sub-model, which is for calculating value of fixed point, that is, the following model of input and output data was individually selected. In other words, 14-bit AD convertor output sub-model selected 14-bit fraction part data output among 16-bit, the Heydemann model parameters input model selected 24-bit fraction part data output among 36-bit, the Heydemann correction model selected 24-bit fraction part data input and output among 36-bit, state transition model detecting and calculating small displacement between two points on circumference selected 24-bit fraction part data input and output among 36-bit. Relative phase calculation of phase meter model, i.e. arctan 2 function calculation selected 18-bit fraction part input and output data for performance with 18-bit CORDIC method, and calculation of accumulated angles and vibration displacement calculation selected 24-bit fraction part input and output data among 36-bit. To reduce accumulated errors from relative phase, next position correction and realignment calculation model selected 24-bit fraction part input and output data among 36-bit. It is impossible to theoretically estimate fixed point input and output transition for 36-bit or 18 bit and effect of round off of inner calculation of individual sub-model of Simulink. Therefore, in the design process, by using value model imitating signals output from light of laser interferometer, there was a research about effects of round off of Simulink's model for vibration displacement measurement except for AD convertor. As a result, standard uncertainty from vibration amplitude calculation was about 0.16 pm. This value was 1.45 times higher than 0.11 pm which was round off error (relative uncertainty of 18-bit calculation) with 18-bit CORDIC method applied to relative phase calculation of phase measurement sub-model, i.e. arctan( ) function calculation. It was considered that the reason was fixed point input and output for 24-bit among 36-bit fraction part data and effect of round off of inner calculation. Accordingly, standard uncertainty was 1.81 pm combining 1.8 pm which is vibration amplitude measurement uncertainty according to 14-bit AD convertor resolution, with 0.16 pm, which is measurement uncertainty according to fixed points input and output and inner calculation round off error selected for Simulink's model calculation. Therefore, measurement uncertainty is 7.1 pm according to digital storage oscilloscope having 12-bit resolution used in non-real time vibration displacement measurement method, in the other hand, vibration displacement measurement standard uncertainty is 1.81 pm using fixed points calculation of 14-bit AD convertor and the FPGA. As a result, it is improved about 4 times better than before.

FIG. 15 shows simplified model of real time vibration displacement measurement model mentioned above. That is, to reduce accumulated errors of relative phase shown in the FIG. 12, real time measurement top model of Simulink without calculation model of correcting and re-aligning next position. The simplified model consists of 5 sub-models, including (1) laser interferometer quadrature outputs model configured by two channels 14-bit AD convertor, (2) a Heydemann model parameters input model, (3) a Heydemann correction model, (4) state transition model detecting and calculation small displacement between two points on circumference, and (5) phase meter model measuring relative phase and calculating accumulated angles and final vibration displacement.

And FIG. 16 shows phase measurement sub-model corrected for Simulink's top model for performing simplified real time vibration displacement measurement mentioned above, and compared to FIG. 12, this is the model deleting the relative phase $\Delta\theta(n)$ output part. The simplified vibration measurement model has disadvantage that accumulated errors of round off of relative phase estimated value is applied to vibration displacement measurement, but since calculation can be performed without a lookup table and Taylor series, which are necessary for calculation of trigonometrical function ($\sin(\Delta\theta(n))$, $\cos(\Delta\theta(n))$), it has advantage to raise speed of the calculation. As a result of value imitation test on the simplified model of FIG. 15 to find out effect of accumulated errors from round off used in estimated value of relative phase, final vibration displacement measurement uncertainty was 2.12 pm, which increased by 0.31 pm from 1.81 pm which is the result when using model that correction of relative phase and realignment of next position. It is considered that this result depends on propriety of 24-bit fixed point data structure among 36-bit selected for calculation of Simulink's sub-model. Similar result is expected when 32-bit fixed point like the DSP, i.e. data of 24-bit fraction part among 32-bit is selected.

Vibration standard research tem of KRISS has made research for production of real time vibration displacement measurement apparatus based on Simulink's model for real time vibration measurement using signals output from the light sensor of the laser interferometer in an analogue manner. FIG. 17 shows a bloc diagram of real time vibration displacement measurement apparatus. The present apparatus selects differential-type light sensor output model as standard type to reduce electrical noise, and comprises differential amplifier with two channels for differential signal input and amplification, two channels 16-bit AD convertor having 100 MHz transition speed, and the FPGA of kintex 7 series of Xilinx. And to send measured vibration displacement signals to the PC in real time, PCIe (PC express) interface is newly selected. Also, to interface with laptop, Gbit Ethernet is established.

The present invention is not limited to the embodiments, not only it can be applied in various ranges, but also a person skilled in the field of the present invention can differently perform the present invention within the claims.

INDUSTRIAL APPLICABILITY

According to the present invention, when measuring vibration displacement with a laser interferometer, precision is improved as much as a few picometers to tens of picometers. Therefore, the present invention saves memory for measurement device, as well as improves precision of measurement. Also, by reducing these accumulated errors, ultimately, precision of measurement can be more improved.

The invention claimed is:
1. A vibration displacement measuring method using an electrical signal output from a light sensor, comprising:

a step of generating the electrical signal output from the light sensor, wherein the electrical signal output is generated by overlapping a reference laser beam reflected from a fixed reference side and a laser beam reflected from an object whose vibration displacement is measured;
a step of discretization, discretizing a cosine signal and a sine signal in the electrical signal output according to index n (n=1, 2, . . . , N);
a step of correction, correcting an oval type signal formed by the cosine signal and the sine signal to a circle type signal by using a Heydemann correction method;
a step of calculation of relative angle, calculating the relative angle between the n-th index and the n−1-th index by using the corrected cosine signals and corrected sine signals at the n-th index and the n−1-th index;
a step of correction and realignment, correcting and realigning the corrected cosine signals and the corrected sine signals at the n-th index and at the n−1-th index by using the relative angle;
a step of calculation of phase, calculating a phase at the n-th index by summing the relative angles accumulated from the first index to the n-th index; and
a step of calculation of displacement, converting the phase at the n-th index into a vibration displacement at the n-th index,
wherein, in the step of correction and realignment, after the step of discretization that the cosine signal ($u_c$) and the sine signal ($u_s$) measured at every predetermined measurement cycle are discretized according to index n (n=1, 2, . . . , N), and the step of correction that the cosine signal ($u_c$) and the sine signal ($u_s$) are converted to the corrected cosine signal ($C_C$) and the corrected sine signal ($C_S$), the corrected cosine signal ($C_C(n-1)$) and the corrected sine signal ($C_S(n-1)$) at the n−1-th index are corrected and realigned according to the following formula:

$$\begin{bmatrix} C_C(n-1) \\ C_S(n-1) \end{bmatrix} = \begin{bmatrix} C_C(n) & -C_S(n) \\ C_S(n) & C_C(n) \end{bmatrix} \begin{bmatrix} \cos(\Delta\theta(n)) \\ \sin(\Delta\theta(n)) \end{bmatrix}.$$

2. According to the vibration displacement measuring method of claim 1,
wherein the cosine signal and the sine signal in the electrical signal output from the light sensor by vibration displacement d are expressed respectively as follows, $$u_C(d) = R\cos\left(4\pi N_B \frac{d}{\lambda}\right) + p \text{ and}$$

$$u_S(d) = \frac{R}{r}\sin\left(4\pi N_B \frac{d}{\lambda} - \alpha\right) + q,$$

wherein R is voltage (V), r is the ratio of sine signal to cosine signal, $\lambda$ is a laser wavelength (m), $N_B$ is the reflection times of beam for measurement (for single reflection, $N_B$=1, and for double reflection, $N_B$=2), a is the quadrature error angle of cosine and sine signals, p and d are DC voltages (offset voltage, V) of cosine and sine signals);
wherein, in the step of discretization, the cosine signal ($u_c$) and the sine signal ($u_s$) measured at each predetermined measurement cycle are discretized according to index n (n=1, 2, ..., N);

wherein, in the step of correction, the Heydemann correction method uses the following formula, $$\begin{bmatrix} u_c^2(1) & u_s^2(1) & u_c(1)u_s(1) & u_c(1) & u_s(1) \\ u_c^2(2) & u_s^2(2) & u_c(2)u_s(2) & u_c(2) & u_s(2) \\ \vdots & \vdots & \vdots & \vdots & \vdots \\ u_c^2(N) & u_s^2(N) & u_c(N)u_s(N) & u_c(N) & u_s(N) \end{bmatrix} \begin{bmatrix} A \\ B \\ C \\ D \\ E \end{bmatrix} = \begin{bmatrix} 1 \\ 1 \\ 1 \\ \vdots \end{bmatrix},$$

wherein the constants from A to E of the formula above are calculated by the least square method and the factors {R, r, a, p, q} of the cosine signal ($u_c$) and the sine signal ($u_s$) are calculated using the following formula:

$$\alpha = \arcsin\left(\frac{C}{2\sqrt{AB}}\right), r = \sqrt{B/A}, p = \frac{2BD - EC}{C^2 - 4AB}, q = \frac{2AE - DC}{C^2 - 4AB}$$

$$R = \frac{1}{\cos\alpha}\left(\frac{1}{A} + p^2 + r^2 q^2 + 2rpq\sin\alpha\right)^{1/2};$$

and wherein the cosine signal ($u_c$) and the sine signal ($u_c$), which are oval type, are converted to the corrected cosine signal ($C_C$) and the corrected sine signal ($C_S$) using the following formula, which are circle type:

$$C_c(d) = R\cos\left(4\pi N_B \frac{d}{\lambda}\right)$$

and $$C_s(d) = R\sin\left(4\pi N_B \frac{d}{\lambda}\right).$$

3. According to the vibration displacement measuring method of claim 1, wherein, in the step of calculation of relative angle, after the step of discretization that the cosine signal ($u_c$) and the sine signal ($u_s$) measured at every predetermined measurement cycle are discretized according to index n (n=1, 2, ..., N) and the step of correction that the cosine signal ($u_c$) and the sine signal ($u_s$) are converted to the corrected cosine signal ($C_C$) and the corrected sine signal ($C_S$), the relative angle ($\Delta\theta$) between the moments at the n-th index and the n-1-th index is calculated according to the following formula:

$$\begin{bmatrix} \cos(\Delta\theta(n)) \\ \sin(\Delta\theta(n)) \end{bmatrix} = \frac{1}{R^2}\begin{bmatrix} C_C(n-1)C_C(n) + C_S(n-1)C_S(n) \\ -C_S(n-1)C_C(n) + C_C(n-1)C_S(n) \end{bmatrix}$$

wherein R is voltage (V).

4. According to the vibration displacement measuring method of claim 3, wherein, in the step of calculation of relative angle, the relative angle ($\Delta\theta$) is calculated from the values of cosine ($\cos(\Delta\theta)$) and sine ($\sin(\Delta\theta)$) of the relative angle ($\Delta\theta$), which is calculated by the corrected cosine signal ($C_C$) and the corrected sine signal ($C_S$), and from a predetermined lookup table that contains a cosign and a sign values at an angle as an input value and a value of angle as an output value corresponding to the input value.

5. According to the vibration displacement measuring method of claim 1, wherein, in the step of calculation of relative angle, the relative angle ($\Delta\theta$) is calculated according to the following formula from the values of cosine ($\cos(\Delta\theta)$) and sine ($\sin(\Delta\theta)$) of the relative angle ($\Delta\theta$) calculated from the corrected cosine signal ($C_C$) and the corrected sine signal ($C_S$):

$$\Delta\theta = \arctan\left(\frac{\sin(\Delta\theta)}{\cos(\Delta\theta)}\right).$$

6. According to the vibration displacement method of claim 1, wherein, in the step of calculation of phase, the phase ($\theta(n)$) at the n-th index is calculated using the following formula:

$$\theta(n) = \sum_{k=1}^{n} \Delta\theta(k)$$

wherein k is a natural number.

7. According to the vibration displacement measuring method of claim 1, wherein, in the step of calculation of displacement, the calculated phase ($\theta(n)$) is converted to the vibration displacement using the following formula:

$$d(n) = \frac{\lambda}{4\pi \cdot N_B}\theta(n)$$

wherein n is discretized index, d is displacement, θ is phase, λ is laser wavelength (m), $N_B$ is reflection times of beam for measurement (for a single reflection, $N_B$=1, and for a double reflection, $N_B$=2).

8. According to the vibration displacement measuring method of claim 1, wherein the vibration displacement measurement method produces a precision level of a few picometers to tens of picometers.

9. According to the vibration displacement measuring method of claim 1, wherein the vibration displacement measurement method calculates the phase and the displacement with one quadrant of memory within a range of 30 degrees such that a storage amount of memory is reduced by at least a quarter to a twelfth as compared to when four quadrants of memory in a range of 360 degrees are used.

* * * * *